United States Patent [19]

Iwanaga et al.

[11] Patent Number: 5,739,946
[45] Date of Patent: Apr. 14, 1998

[54] DISPLAY DEVICE

[75] Inventors: Hiroki Iwanaga; Seizaburo Shimizu; Masaki Okajima; Masayuki Saito; Atsushi Sugahara; Kazuyuki Sunohara, all of Yokohama; Aira Hotta, Tokyo, all of Japan

[73] Assignee: Kabushiki Kaisha Toshiba, Kawasaki, Japan

[21] Appl. No.: 716,529

[22] Filed: Sep. 19, 1996

[30] Foreign Application Priority Data

Sep. 21, 1995 [JP] Japan .................. 7-242250

[51] Int. Cl.⁶ .................................. G02B 26/00
[52] U.S. Cl. .................. 359/296; 359/290; 345/105; 345/107; 204/450
[58] Field of Search .................... 359/290, 296, 359/301; 345/106, 105, 107; 204/450, 600

[56] References Cited

U.S. PATENT DOCUMENTS

| | | | |
|---|---|---|---|
| 4,093,534 | 6/1978 | Carter et al. | 359/296 |
| 4,126,854 | 11/1978 | Sheridon | 359/296 |
| 4,657,349 | 4/1987 | Labes et al. | 359/296 |
| 4,786,149 | 11/1988 | Hoening et al. | 359/290 |
| 4,919,521 | 4/1990 | Tada et al. | 359/296 |
| 5,007,714 | 4/1991 | Nishimura et al. | 359/296 |

FOREIGN PATENT DOCUMENTS 61-151226   7/1986   Japan .

*Primary Examiner*—Loha Ben
*Attorney, Agent, or Firm*—Oblon, Spivak, McClelland, Maier & Neustadt, P.C.

[57] ABSTRACT

A novel display device suitable as a portable display device is disclosed. The device includes a pair of substrates and a light modulation layer sandwiched between the substrates. A functional gel is adapted to be deformed by an electric field applied between a pair of electrodes interposed between the substrates, thereby regulating the light incident on the light modulation layer. A high contrast, a high reflectance and a high light utilization are achieved without regard to the angle of visibility.

17 Claims, 18 Drawing Sheets

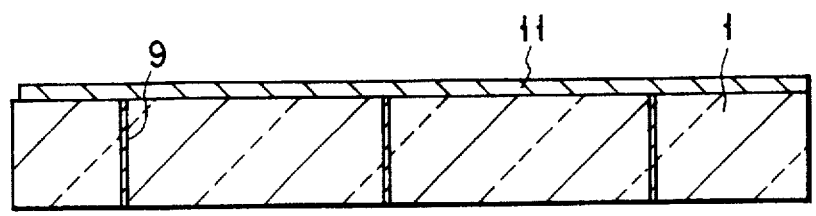
F I G. 4
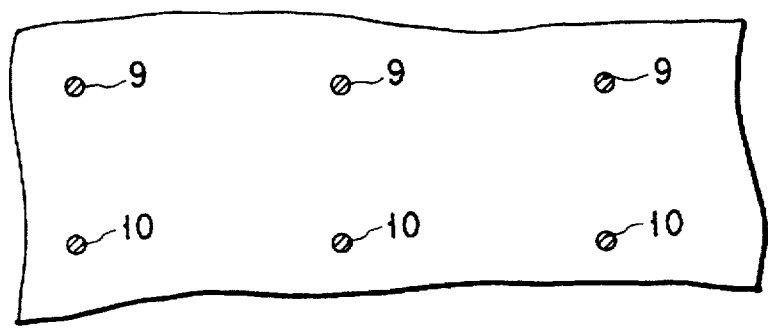
F I G. 5
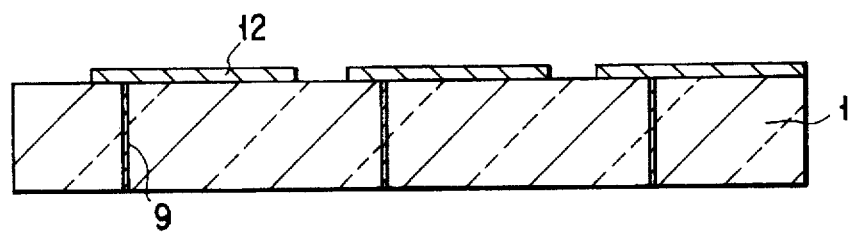
F I G. 6
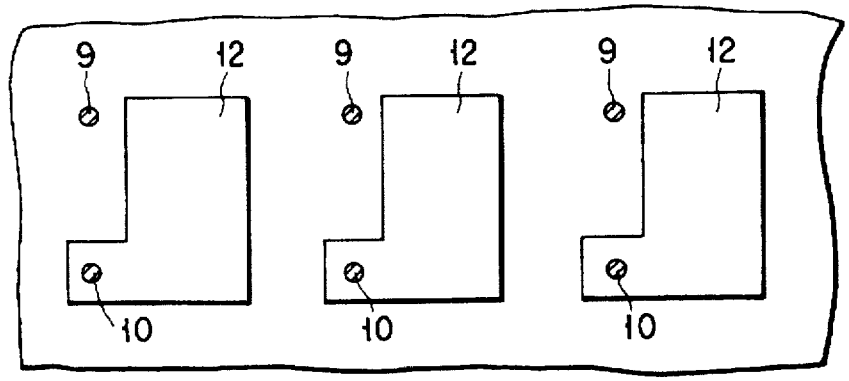
F I G. 7

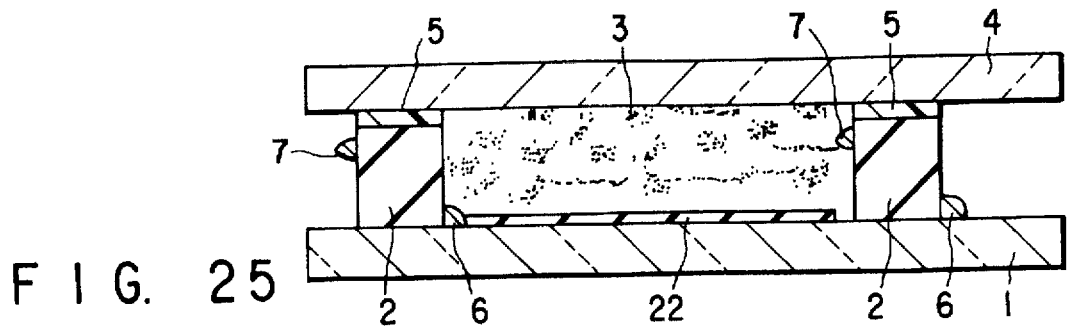
F I G. 25
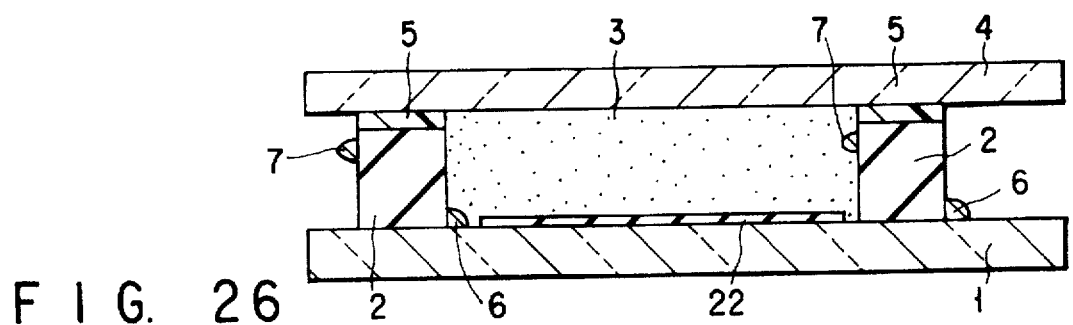
F I G. 26
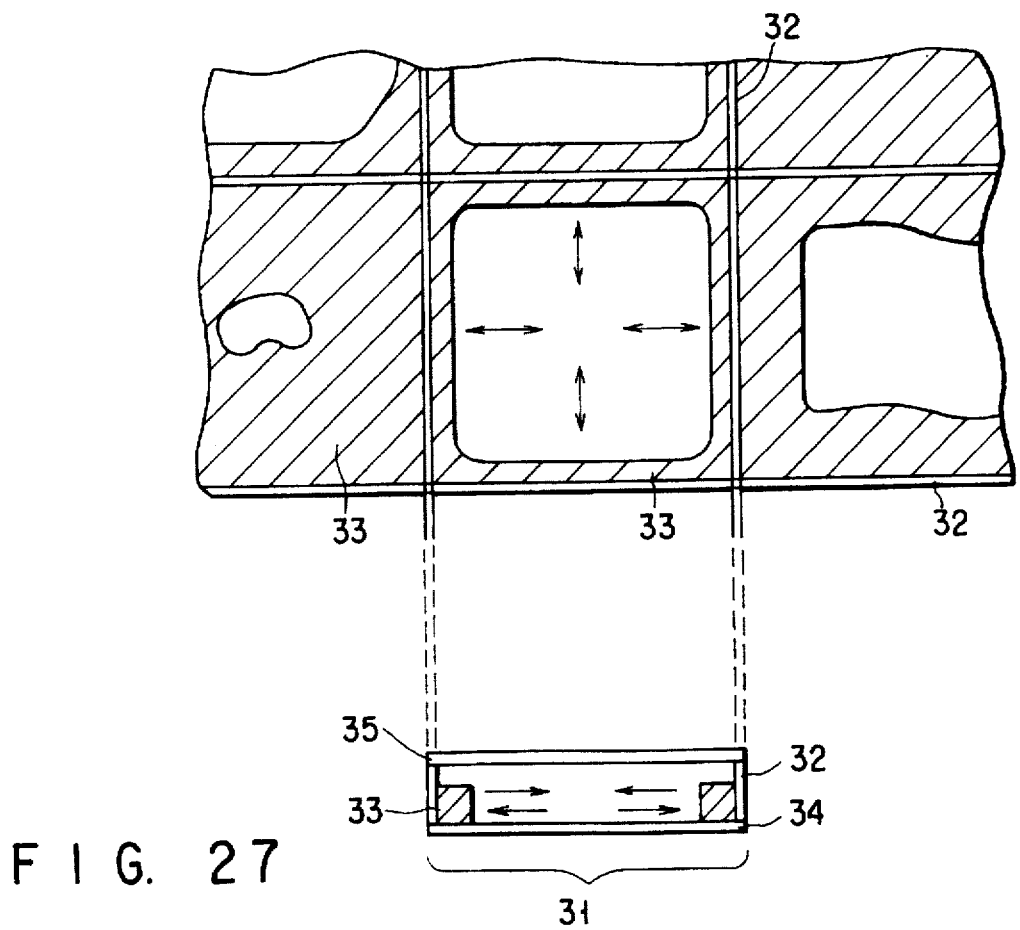
F I G. 27

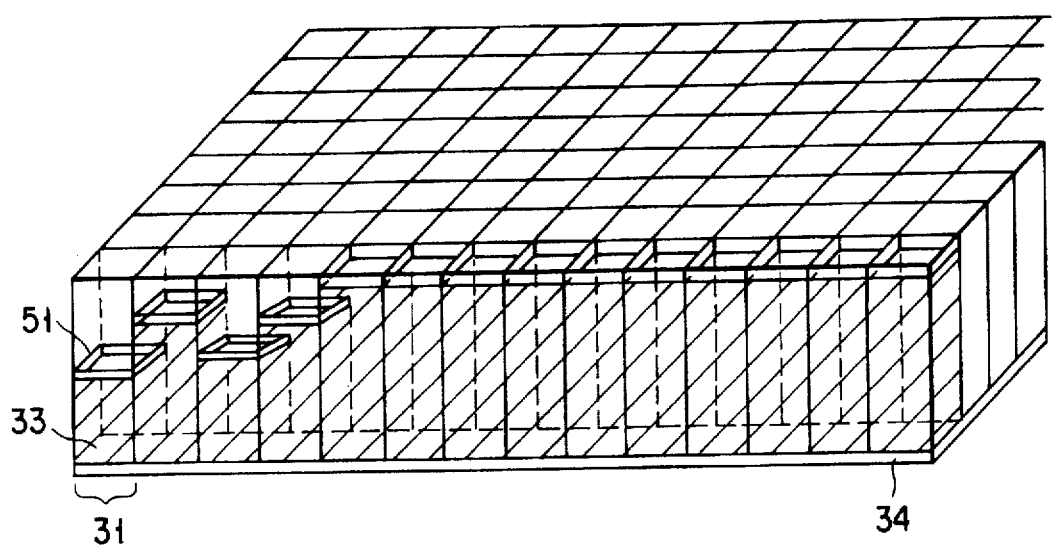
F I G. 31
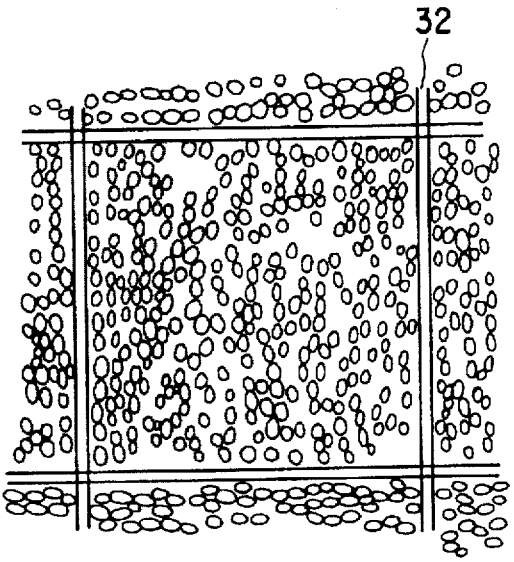
F I G. 32A
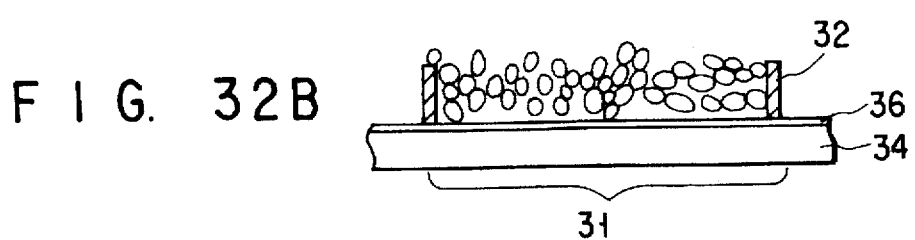
F I G. 32B

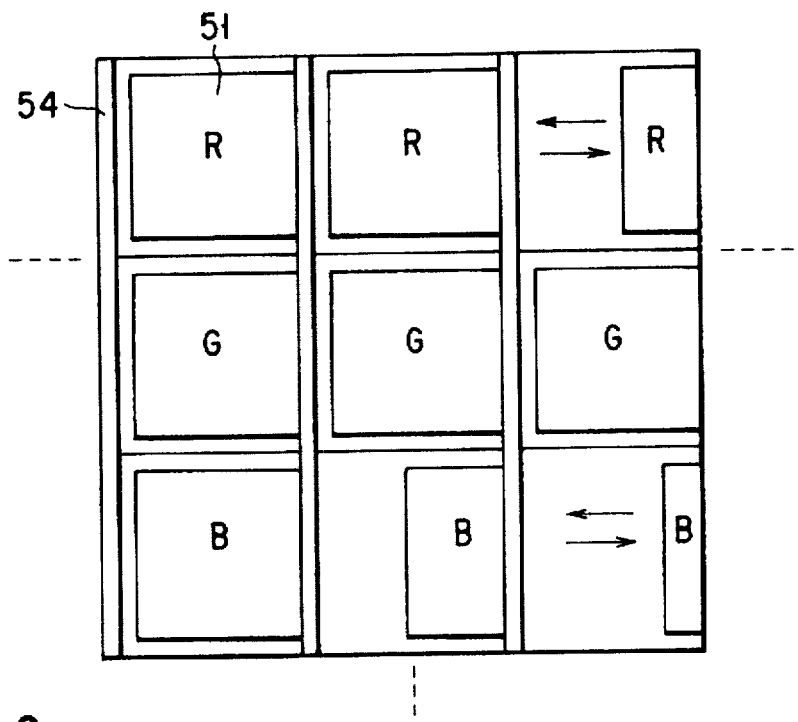
F I G. 40
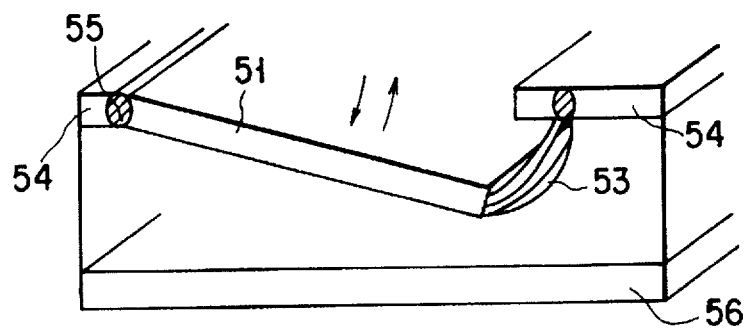
F I G. 41
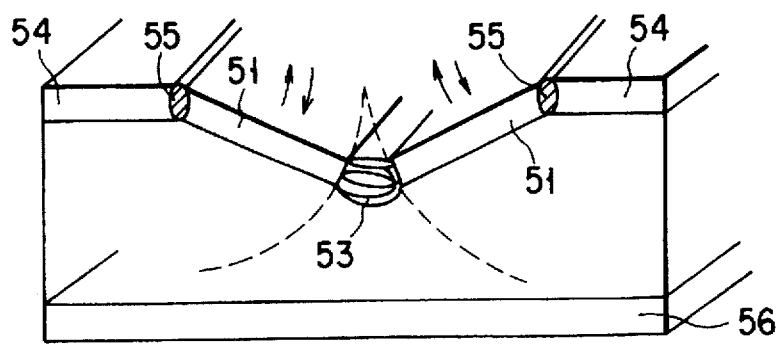
F I G. 42

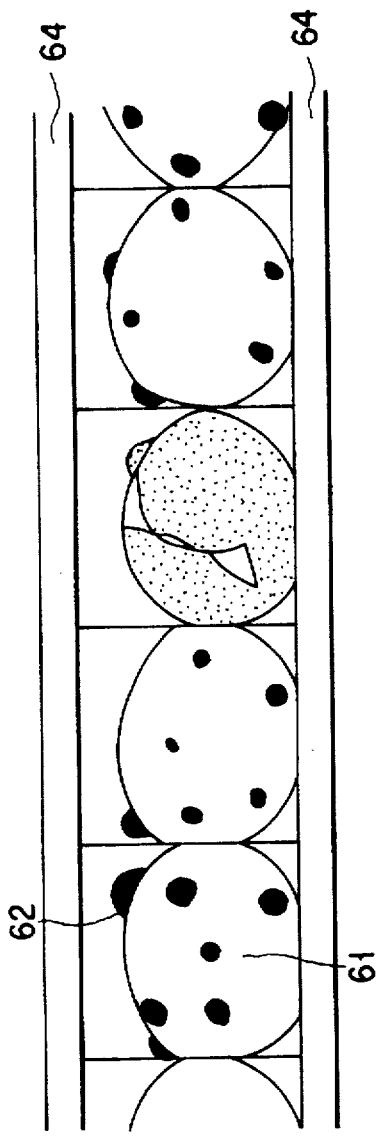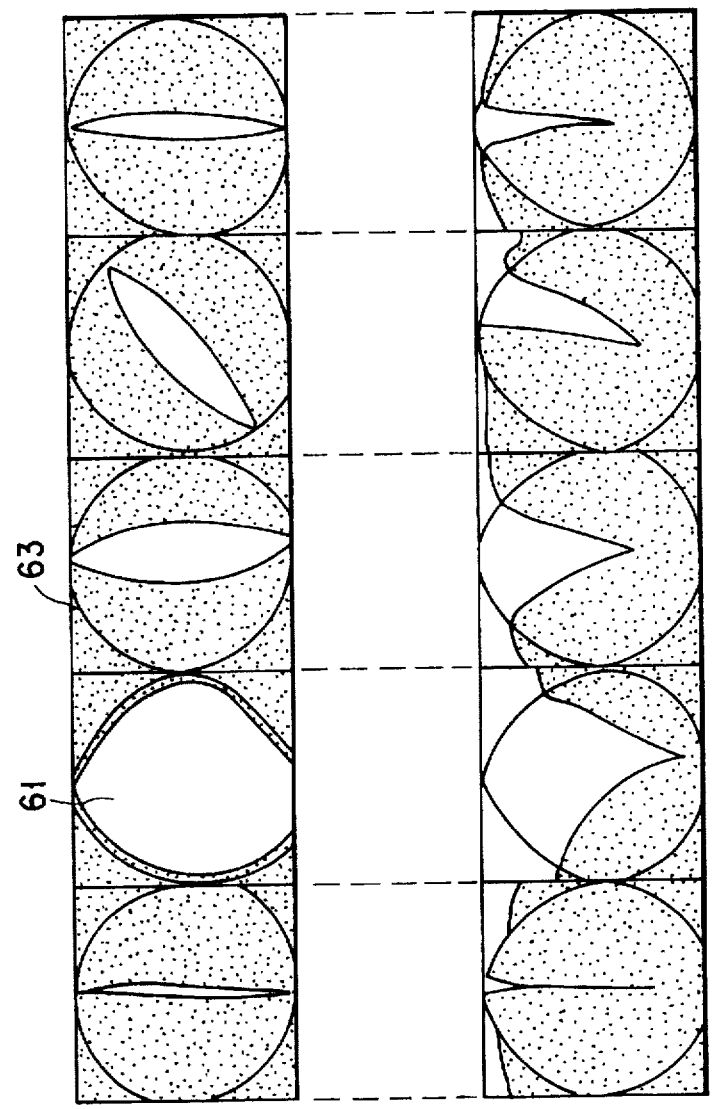
F I G. 55
F I G. 56A
F I G. 56B

DISPLAY DEVICE

BACKGROUND OF THE INVENTION

1. Field of the Invention

The present invention relates to a novel display device.

2. Description of the Related Art

Various display devices such as the CRT, the liquid crystal display and the plasma display have been put into practice. Especially, the liquid crystal display is suitable for a thin structure with low power consumption and has come to be widely used as a display device for the word processor and the personal computer.

On the other hand, demand is high for thinner display devices lower in power consumption for portable terminals. The power consumption cannot be reduced for the liquid crystal display devices of the type requiring back light or the plasma display which emits its own light. Research and development efforts are therefore expedited for a reflective display device which displays an image by reflecting an external light.

A liquid crystal display device of reflective type is under development. The disadvantage of the liquid crystal, however, is that it is basically dependent on the field of view. Depending on the angle of view, the contrast changes or the black and white are reversed in what is called the color inversion. On the other hand, the reflective display device requires a high reflectance and a high light utilization to realize a white display (paper white) similar to the paper. In spite of this, the reflectance and the light utilization of the liquid crystal display is low due to the low reflectance of the liquid crystal itself and the small light transmittance of the orientation film. The liquid crystal display, therefore, has many structural problems of low contrast and very low visibility.

SUMMARY OF THE INVENTION

The present invention has been developed in view of these problems, and the object of the invention is to provide a novel display device suitable as a portable display unit in which a high contrast, a high reflectance and a high light utilization rate are achieved without depending on the angle of view.

According to one aspect of the invention, there is provided a display device comprising a pair of substrates each having an electrode, and a light modulation layer arranged between the substrates, wherein the light modulation layer includes a functional gel distorted by an electrode field applied between the electrodes, and the light incident on the light modulation layer is regulated by the deformation of the functional gel.

According to another aspect of the invention, there is provided a display device comprising a pair of substrates each having an electrode and a light modulation layer arranged between the substrates, wherein the light modulation layer includes particles adapted to coagulate and disperse by an electric field applied between the electrodes, and the light incident on the light modulation layer is regulated by the coagulation and dispersion of the particles.

BRIEF DESCRIPTION OF THE DRAWINGS

FIGS. 4, 6, 8, 10, 11, 13 and 15 are sectional views for explaining the fabrication steps of a display device according to the first embodiment.

FIGS. 5, 7, 9, 12, 14 and 16 are plan views for explaining the fabrication steps of a display device according to the first embodiment of the invention.

FIGS. 25 and 26 are sectional views showing a display device according to a fifth embodiment of the invention.

FIG. 27 is a plan view showing a display device according to a sixth embodiment of the invention.

FIG. 31 is a perspective view of a display device according to a ninth embodiment of the invention.

FIGS. 32A and 32B are views showing a display device according to a tenth embodiment of the invention.

FIG. 40 is a plan view showing another example of the display device according to the 15th embodiment of the invention.

FIG. 41 is a perspective view of a display device according to a 16th embodiment of the invention.

FIG. 42 is a perspective view of a display device according to a 17th embodiment of the invention.

FIGS. 55 and 56B are sectional views showing a display device according to the 19th to 23rd embodiments of the invention.

FIG. 56A is a plan view show display device according to the 19th to , 23rd enmbodiments of the invention.

DETAILED DESCRIPTION OF THE PREFERRED EMBODIMENTS

Figure 1:
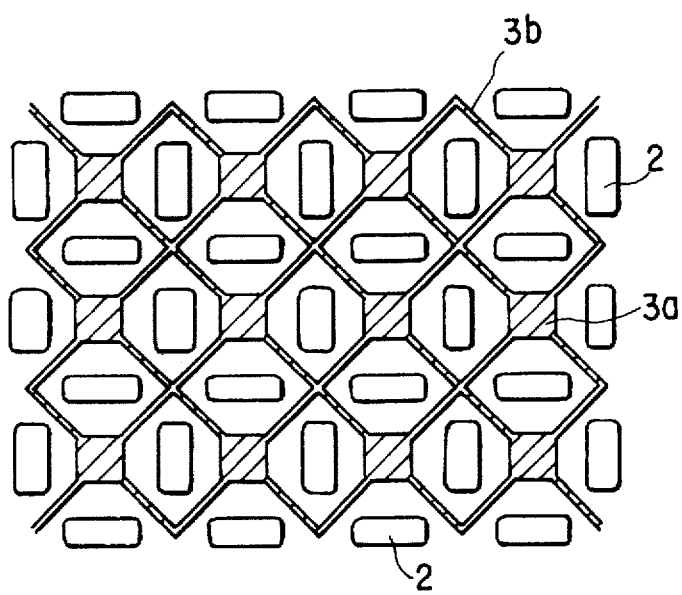
FIG. 1 is a plan view showing a display device according to a first embodiment of the invention.

A display device according to the invention comprises a light modulation layer between a pair of substrates each having an electrode, which layer includes a functional gel adapted to be deformed by an electric field applied between the electrodes. The light incident on the light modulation layer is thus regulated by the deformation of the functional gel. The change of the functional gel is defined as the bending/extension, contraction/expansion (volume change), coagulation/dispersion or the like.

Another feature of the display device according to the invention resides in that the light modulation layer between a pair of substrates each having an electrode includes particles adapted to coagulate and disperse by an electric field applied between the electrodes, so that the light entering the light modulation layer is regulated by the coagulation and dispersion of the particles.

According to a first aspect of the invention, there is provided a display device wherein a light modulation layer held between a pair of substrates includes a suspension or an emulsion, a film-like functional gel arranged in the suspension or the emulsion, and at least two electrodes so disposed as to sandwich the film-like functional gel. When an electric field is applied between the two electrodes, the functional gel assumes a status in contact or out of contact with the surface of one of the substrates thereby to display an image.

According to a second aspect of the invention, there is provided a display device wherein a light modulation layer held between a pair of substrates each having an electrode has an end thereof fixed. The light modulation layer has a structure including a film-like functional gel adapted to extend/bend. When an electric field is applied between the two electrodes, the film-like functional gel is extended or bent, so that the substrate surface becomes visible or invisible thereby to display an image.

According to a third aspect of the invention, there is provided a display device wherein a light modulation layer held between a pair of substrates each having an electrode has a structure including a particulate functional gel adapted to contract/expand. When an electric field is applied between the electrodes, the particulate functional gel is contracted or expanded so that the substrate surface becomes visible or invisible thereby to display an image.

In the third aspect of the invention, the grain size of the particulate functional gel in contracted state is preferably 0.3 µm or more. As a result, it is possible to scatter the visible light. Also, the particulate functional gel is preferably dispersed in a liquid or a gel. This makes it possible to disperse the gel without forming a film.

According to a fourth aspect of the invention, there is provided a display device wherein a light modulation layer held between a pair of substrates each having an electrode has a structure including a woven fibrous functional gel adapted to contract/expand. When an electric field is applied between the two electrodes, the woven fibrous functional gel is contracted or expanded so that the substrate surface becomes visible or invisible thereby to display an image.

According to a fifth aspect of the invention, there is provided a display device wherein a light modulation layer held between a pair of substrates each having an electrode has a structure including particles adapted to coagulate/disperse. When an electric field is applied between the two electrodes, the particles coagulate or disperse, so that the substrate surface becomes visible or invisible thereby to display an image.

In the fifth aspect, the size of the particles adapted to coagulate or disperse is preferably 0.3 µm or less. As a result, it is possible to depress the scattering of the visible light.

In the first to fifth aspects of the invention, the electrodes are preferably arranged on the partitioning walls defining the pixels formed on the substrates. As a result, it is possible to select the electrode material freely.

According to a sixth aspect of the invention, there is provided an image display device wherein a light modulation layer held between a pair of substrates each having an electrode has a structure including pigment particulates or colored particulates and a functional gel existing at least in a part of the surface of the particulates. When an electric field is applied between the two electrodes, the functional gel is changed in volume, so that the substrate surface becomes visible or invisible thereby to display an image.

In a display device using a functional gel adapted to bend/extend according to the invention, a minuscule display plate or a thin film arranged for each pixel of a predetermined color is directly viewed. The position of the display plate or the thin film is controlled by the bending and extension of a flexible stimulus-responsive polymer gel (hereinafter referred to as the flexion responsive gel) constituting the function gel.

In the case where the flexible functional gel is used, the display plate is made movable and a part of the display plate may be fixed on the flexion responsive gel, so that the display plate may be controlled to open or close in the direction perpendicular to the substrate surface by the motion of the flexion responsive gel. In this case, if the movable display plate is colored white, a white display is obtained when the gel is linear in shape, while a black display is attained when the flexion responsive gel is bent. The color display is also possible by coloring the display plate appropriately.

In the case where the flexible functional gel is used, a part of the movable display plate may be fixed on the flexion responsive gel and held under an adjacent pixel. In a display device having such a configuration, the substrate is colored black, for example, while at the same time using a light-scattering white display plate. In this way, a black-and-white display with a high contrast is made possible. In other words, white is displayed when the flexion responsive gel is linear in shape, while the substrate is displayed in black when the flexion responsive gel is bent and held under the adjacent pixel. Also, a reflection plate may be disposed on the substrate surface and the black-and-white display is made possible by coloring the display plate in black.

The flexion responsive gel may be made of such a material as polyvinylalchol-polyacrilic acid composite. Also, what is called an artificial muscle which is a minuscule rod-shaped gel covered with a gel film may be used as the flexion responsive gel in order to suppress the leakage of the electrolyte.

In order to increase the transfer speed of the movable display plate, the magnetic force, electrostatic force or the like driving force other than the gel may be used with equal effect.

The color display becomes possible, for example, by arranging light-transmissible display plates colored yellow, cyan and magenta. In the color display system of this type, the use of a light-transmissible colored display plate permits display of various colors including yellow, cyan, magenta, red, green, blue, black and white by a single pixel, and therefore a bright, clear image can be displayed. The color display is also possible by juxtaposing a plurality of light-scattering display plates of different colors.

In the case where the flexible functional gel is used, the opposite ends of the rod-shaped flexion responsive gel having a thin film may be fixed on the outer periphery of the pixel so that the shape of the thin film may be controlled by bending and extending the flexion responsive gel. In other words, when the flexion responsive gel is linear in shape, the thin film covers the pixel, while when the flexion responsive gel is bent, the thin film moves to the periphery of the pixel so that the substrate can be directly viewed. This thin film may be made white and the substrate colored black, or with a reflection plate arranged on the substrate surface, the thin film may be colored black. In this way, a black-and-white display with high contrast is realized. The color display is also made possible by overlaying or juxtaposing a plurality of thin films of different hues. Further, in the case where a plurality of light-transmissible thin films colored yellow, cyan and magenta are overlaid, the various colors including yellow, cyan, magenta, red, green, blue, black and white can be displayed by a single pixel, thereby making possible a bright, clear image display.

Further, in the case where the flexible functional gel is used, an end of the rod-shaped flexion responsive gel having a thin film may be fixed on the outer periphery of the pixel, and the opposite end of the gel may be positioned at the pixel center. More specifically, in the case where the flexion responsive gel is linear in shape, the thin film covers the pixel, while when the flexion responsive gel is bent, the thin film moves to the periphery of the pixel, thereby making it possible to directly view the substrate. This thin film is colored white and the substrate black, or with a reflection plate arranged on the substrate surface, the thin film is colored black. In this way, a black-and-white display with a high contrast is realized. Also, a plurality of thin films of different hues are overlaid or juxtaposed to realize the color display. In this case, if a plurality of light-transmissible thin films colored yellow, cyan and magenta are overlaid, various colors including yellow, cyan, magenta, red, green, blue, black and white can be displayed by a single pixel, thereby making it possible to display a bright, clear image.

In a display device using all expansible/contractible functional gel according to the invention, an expansible/contractible stimulus responsive gel (hereinafter referred to as the expansible/contractible gel) constituting the functional gel is arranged around a pixel, and is caused to expand toward the pixel center under an electrical stimulus. In this case, the expansible/contractible gel is colored white and the substrate black, or the expansible/contractible gel is colored black and the substrate white, thereby realizing a black-and-white display. This method is the one in which the expansible/contractible gel or the substrate is viewed directly, and therefore a high contrast is obtained. Also, in this method, cells including expansible/contractible gels colored yellow, cyan and magenta are deposited in three layers to display colors. This method makes possible display of various colors including yellow, cyan, magenta, red, green, blue, black and white by a single pixel. A clear color image high in contrast, therefore, can be displayed. Also, this method can display colors by depositing three layers of cells including the light-scattering expansible/contractible gels of red, green and blue. Further, in this method, the light-scattering expansible/contractible gels are arranged on light-transmissible yellow, cyan and magenta filters, or the light-scattering or light-absorbing expansible/contractible gels are arranged on light-absorbing yellow, cyan and magenta filters, so that these expansion/contractible gels can be used as shutters on the filters.

Also, in the case where a functional gel adapted to expand and contract is used, the expansible/contractible gel may be arranged in the bottom of a cylindrical case arranged for each pixel. In the case where the surface of the cylindrical case is colored black and a white expansible/contractible gel is used, for example, the display is black when the gel is contracted and white when the gel swells. In this method, the expansible/contractible gel may be of a predetermined color thereby to display colors. Also, in this method, the contrast can be increased by changing the shape of the cylinder.

Figure 52:
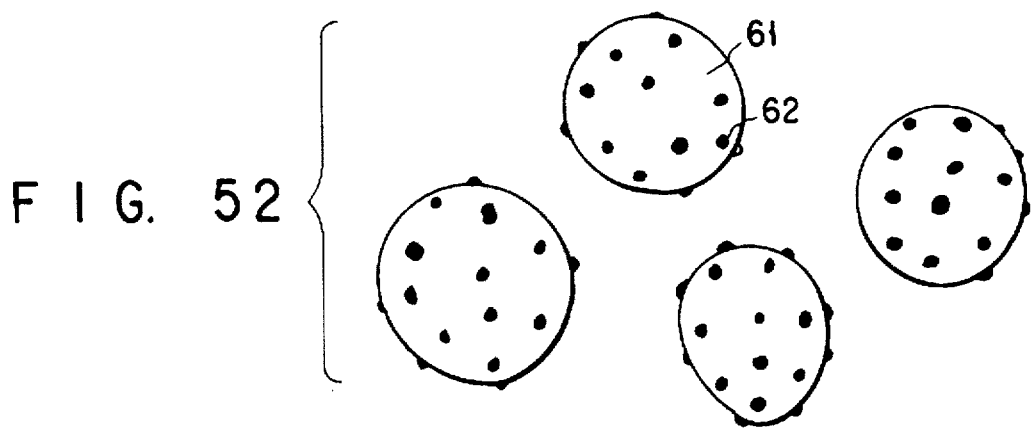
FIGS. 52, 53A, 53B and 54 are diagrams for explaining the particulates used for the display devices according to 19th to 23rd embodiments of the invention.

Also, in the case where an expansible/contractible functional gel is used, as shown in FIG. 52, the surface of pigment particulates or colored particulates 61 used for color display are caused to absorb expansible/contractible gel particulates 62, so that the pigment particulates or the coloring particulates may be made visible or invisible by the expansion and contraction of the expansible/contractible gel thereby to display an image. In the case where white particulates are used as an expansible/contractible gel, for example, the gel is expanded (swelled) and covers the surface of the pigment particulates or the colored particulates thereby to display white, while the gel is contracted to display the color of the pigment particulates or the colored particulates. Also, the expansible/contractible gel particulates may be have a hue different from the pigment particulates or the colored particulates, so that the hue may be continuously changed by the volume change of the expansible/contractible gel particulates. Further in the case where the expansible/contractible gel particulates are colored black, the color of the pigment particulates or the colored particulates is displayed when the gel contracts, while black is displayed when the gel expands.

Figures 53A, 53B:
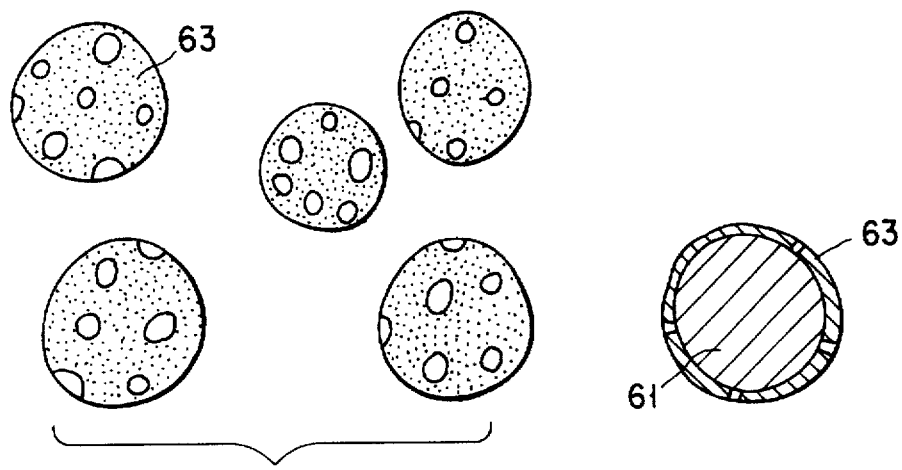
Figure 54:
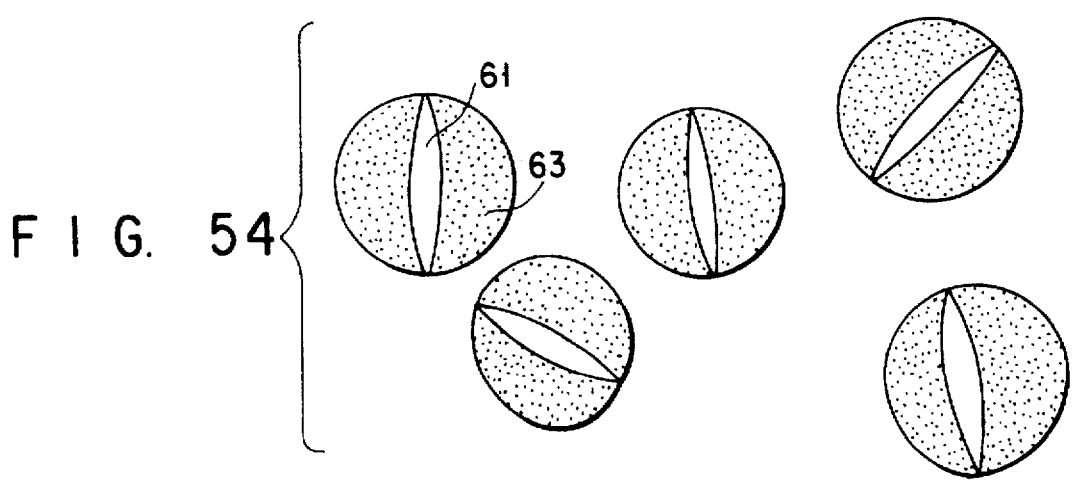

In this method, as shown in FIGS. 53A, 53B and 54, the pigment particulates or the colored particulates may be covered with an expansible/contractible gel thin film 63 having a single or a plurality of holes or cracks. In this case, suppose the gel thin film is white. When the gel thin film contracts, the area of each hole increases to display the color of the pigment particulates or the coloring particulates, while when the gel thin film expands, a white image is displayed. In this method, the hue can be changed continuously by coloring the gel thin film with a hue different from the pigment particulates or the colored particulates and regulating the area of the hole or crack on the gel thin film. Also, according to this method, in the case where the gel thin film is colored black, the color of the pigment particulates or the coloring particulates can be displayed when the gel thin film contracts, while when the gel thin film expands, the black display is made possible.

Also, in this method, as shown in FIG. 55, the display device may have such a structure that a single pigment particulate or a single coloring particulate having an expansible/contractible gel particulate on the surface thereof may be arranged for each pixel. In FIG. 55, numeral 64 designates a substrate. In this case, assume that a white expansible/contractible gel is used. When the gel particulate expands and covers the surface of the pigment particulate or the coloring particulate, white is displayed, while when the gel particulate contracts, the color of the pigment particulate or the colored particulate can be displayed. Also, the gel particulate may be colored with a hue different from the pigment particulate or the colored particulate, and the hue may be continuously changed by the volume change of the gel particulate. Further, in the case where the gel particulate is colored black, the color of the pigment particulate or the colored particulate can be displayed when the gel particulate contracts, while black can be displayed when the gel particulate swells.

Furthermore, as shown in FIGS. 56A and 56B, the display device may have such a structure that a pigment particulate or the colored particulate 61 covered by an expansible/contractible thin film having a single or a plurality of holes may be arranged for each pixel. In the case where the pigment particulate or the colored particulate 61 is covered by a gel thin film 63 having a single hole or a single crack, the center of the hole or the crack is preferably directed to the front of the display device.

The pigment particulate or the colored particulate having an expansible/contractible gel in at least a part thereof according to the present invention can be obtained by using the coating granulation method or the core salvation method with the pigment particulate or the coloring particulate, as the case may be, as a core.

Possible materials of the expansible/contractible gel include a high water-absorbing polymer of starch group, a high water-absorbing polymer of cellulose group, a high water-absorbing polymer of hyaluronic acid group, high water-absorbing polymer of polyvinyl alcohol group, a high water-absorbing polymer of acrilyc acid group, high water-absorbing polymer of acryl amide group, a high water-absorbing polymer of polyoxyethylene group, a cross-linked copolymer of polystylene sulfonic acid or acryl amide methyl propane sulfonic acid, polyurethane resin or various organo gels.

A display device using functional gel particulates according to this invention has an area where the stimulus-responsive gel particulates (hereinafter referred to as the gel particulates) constituting a particulate functional gel are dispersed on a black absorbing material or a color filter. This method is intended to control the transmission-scattering of the visible light by changing the grain size of the gel particulates. In the case where the gel particulates of a grain size larger than the visible light wavelength are dispersed, for example, the light-transmissible condition is a steady state. When the gel particulates are contracted under stimulus, the grain size is reduced below the range of the visible light wavelength and assumes a light-transmissible state, whereby the light transmission and scattering can be controlled. In the case where the gel particulates with a grain size within the wavelength range of the visible light are dispersed, on the other hand, the steady state is the scattering. In such a case, when the gel particulates contract under stimulus, the grain size decreases below the wavelength range of the visible light into the light-transmissible state, whereby the light transmission and scattering can be controlled. In this method, in order to improve the light scattering performance, particulates of a polymer or an inorganic material of a grain size less than the wavelength range of the visible light are mixed with the gel particulates thereby to improve the contrast. Also, in this method, the gel particulates containing red, green and blue coloring matters of different stimulus response characteristics are made to coexist in the same pixel, and the strength or magnitude of the stimulus applied is controlled. By changing the volume of the gel particulates of specific types selectively in this way, the hue can be changed.

According to this invention, particles of an inorganic polymer gel etc. can be employed as the coagulative/dispersive particles for the display device. The grain size of such particles is preferably between 0.3 µm and 2.0 µm taking light scattering into consideration.

In a display device according to the invention a functional gel is formed like a film or fiber for each pixel, and an electric field is applied or not applied, or electrical signal voltages of different polarities are applied to the functional gel, whereby the functional gel is bent/extended, contracted/expanded or otherwise deformed. Using this deformation of the functional gel as an optical shutter, the desired image can be produced.

Alternatively, a multiplicity of particles may be arranged for each pixel, and are supplied or not supplied with an electric field, or supplied with voltage signals of different polarities, thereby coagulating or dispersing the particles. An image can be obtained by regulating the light transmission as the particles coagulate or disperse in this manner.

In a display device according to the present invention, a electric field or an electrical signal can be applied to the functional gel efficiently, especially, by arranging the electrodes in such a position as to hold the functional gel therebetween. In this way, a superior deformation of the functional gel can be caused for an improved contrast. In this case, a transparent electrode may be formed on each of a pair of substrates, and the functional gel may be interposed between the substrates with the transparent electrodes arranged thereon in opposed relation to each other. As an alternative, a wall adjoining a pair of substrates is formed between the substrates, and electrodes are formed above and below the wall, with a functional gel arranged between the substrates.

In a display device according to the invention, an ideal display condition is realized without being affected by the physical parameters of the dichroic pigment or liquid crystal which has posed a problem in the conventional guest-host liquid crystal display device. As a result, a bright and clear color display impossible with the conventional display devices is made possible with a high contrast. Also, the simple structure of the invention permits low-cost production making the device suitable for mass production.

The display device according to the invention can use the same materials for the substrates, electrodes and element as are usually used for ordinary display devices.

Now, embodiments of the present invention will be specifically described with reference to the accompanying drawings. The invention is not limited to these embodiments but can be embodied in various modifications with equal effect without departing from the scope and spirit of the invention.

[Embodiment 1]

According to the present embodiment, a dyed film-like functional gel is arranged between a pair of opposed substrates, and a suspension or an emulsion is filled between the substrates. The polarities of the electrodes or the voltage between the electrodes sandwiching the functional gel is changed or an electrical signal is otherwise applied to bend or extend the functional gel repeatedly. The functional gel thus is repeatedly caused to come into contact and leave out of contact with the surface (transmissible surface) of the upper substrate thereby to display an image.

The upper substrate is a transparent substrate of glass or the like. In the case where the film-like functional gel comes into contact with the transparent substrate, the color of the dyed gel can be viewed from above. When the gel is not in contact with the transparent substrate, on the other hand, the color of the suspension or the emulsion can be viewed.

Figure 2:
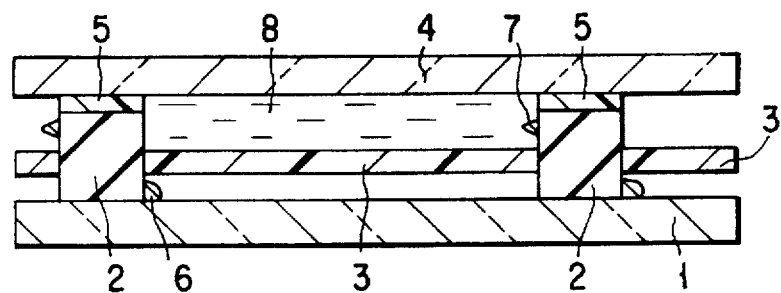
FIGS. 2 and 3 are sectional views showing a display device according to the first embodiment of the invention.
Figure 3:
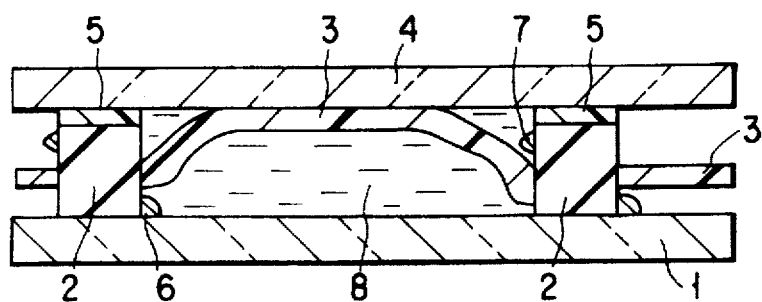

With reference to FIGS. 1 to 3, the configuration of a display device according to the present embodiment will be explained. As shown in FIG. 1, side walls 2, made of a resin or the like, each having an electrode at an upper portion and a lower portion are formed to surround all the sides of each pixel on the lower substrate 1. Each portion surrounded by the side walls 2 is formed with a film-like functional gel 3a by printing or other means. Each film-like functional gel 3 is connected to fibrous functional gels 3b in four directions in a network. Also, the upper substrate 4, as shown in FIG. 2, is arranged in opposed relation with the lower substrate 1 with a gap formed therebetween by an adhesive 5 formed by printing or the like means.

The electrodes for supplying an electrical signal to the film-like functional gel 3 include an upper electrode 7 formed on the upper substrate 4 side of the side walls and a lower electrode 6 formed on the substrate 1 side of the side walls in such positions to sandwich the film-like functional gel 3. A suspension or an emulsion 8 is injected into the gap between the lower substrate 1 and the upper substrate 4. According to this embodiment, the resin forming the film-like functional gel 3 swells into a gel state as a result of injection of the suspension or emulsion. This resin increases in volume (surface area) by swelling and gelation. Each film-like functional gel 3, therefore, is located in a discrete position between the upper substrate 4 and the lower substrate 1. Upon application of a voltage in such a manner that the resin comes into contact with the lower substrate 1 before complete swelling, the gel is deformed to contact the lower substrate at the time of resin gelation.

In the display device according to this embodiment, the functional gel 3 is distorted and displaced toward the upper substrate 4 upon application of a voltage thereto, and thus comes into contact with the upper substrate 4 of glass or the like, as shown in FIG. 3. Under this condition, the pixel, as observed from above (from the upper substrate 4 side), presents the color of the film-like functional gel 3.

When the voltage is turned off, on the other hand, the functional gel is distorted toward the lower substrate 1 side, and when viewed from above, the pixel exhibits the color of the suspension or emulsion. In the case where a white emulsion is dispersed as a suspension or an emulsion, for example, a paper-like white color (paper white) is presented. In this way, the turning on/off of a voltage makes possible black and white display.

As described above, in the display device according to the present invention, an on-off electrical signal of a voltage is applied to switch between the mode in which the dyed gel is pressed against the transparent substrate surface (FIG. 3) and the mode in which the initial state is restored (FIG. 2). The first mode (FIG. 3) presents the color of the film-like functional gel, and the restored mode (FIG. 2) is accompanied by the color of the suspension or emulsion filled between the upper substrate and the lower substrate, thereby displaying an image. When a voltage opposite in polarity to the abovementioned one is applied, on the other hand, the functional gel can be switched between the mode in which the functional gel is in contact with the upper substrate 4 and the mode in which the functional gel is attracted to the lower substrate 1.

The resin constituting the functional gel, unless partially crosslinked, may be dissolved in the suspension or emulsion. By regulating the crosslinking degree, however, the gel swell can be controlled and the dissolution of the resin in the suspension or emulsion can be prevented. The crosslinking of the resin can be regulated by various methods. For example, a crosslinking agent is added for ion crosslinking or resin synthesis or the resin is crosslinked by hydrolysis after being synthesized. In the case where the resin crosslink is regulated by ion crosslinking, the ion concentration in the swollen liquid (suspension or emulsion) and the ion component concentration of the carbonic acid, sulfonic acid or amine are adjusted. In the case where a crosslinking agent is added, on the other hand, the amount of the agent is determined according to the regulation of the ion crosslinking.

Also, in the case where the color display is made on the display device according to the present embodiment, the film-like functional gels are dyed in the three primary colors of red, green, blue or cyan, magenta, yellow.

Now, a method of fabricating a display device according to the present embodiment will be explained.

First, as shown in FIGS. 4 and 5, a pair of electrodes 9, 10 are formed through the lower substrate 1 from the back to front sides thereof (from the bottom upward in the drawing). An electrode layer 11 is formed by sputtering or vapor deposition on the surface of the lower substrate 1. A driving wire (not shown) for applying a voltage between the electrodes 9 and 10 is formed on the back of the lower substrate 1. Copper or nickel may be used as a material of the electrodes 9, 10. The electrode layer 11, on the other hand, may be made of such a material as copper, nickel or gold. The materials which may be used for the lower substrate 1 include polyester resin, epoxy resin, polyurethane resin, polyimide resin, polyamide resin, fenol resin, polyorefin resin, polyether resin, silicon resin and glass. In this case, an epoxy resin material is used for the lower substrate 1.

Now, as shown in FIGS. 6 and 7, the electrode 11 is patterned by etching to form a lower thin film electrode 12 in a manner to connect not to the electrode 9 but to the electrode 10.

Figure 8:
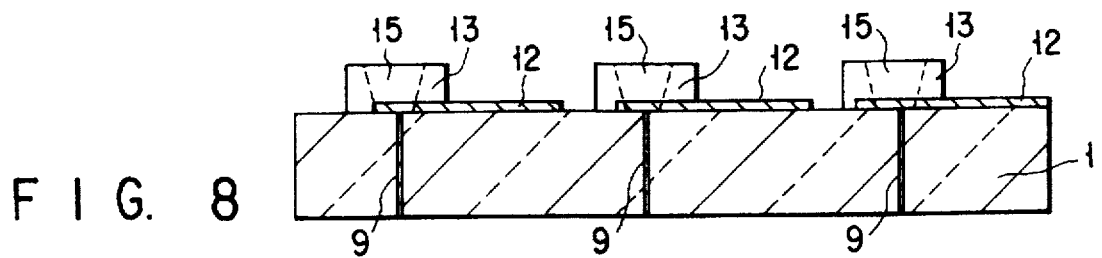
Figure 9:
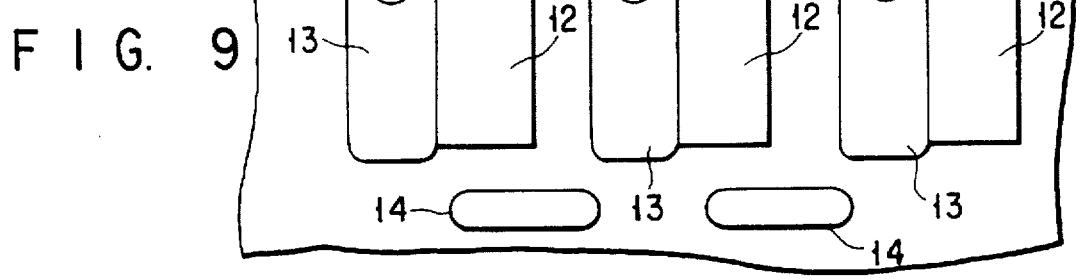

Then, as shown in FIGS. 8 and 9, insulating layers 13, 14 constituting side walls 2 are formed by printing or the like process on the lower thin film electrode 12. In the process, the insulating film 13 is bored with a hole 15 to prevent the insulating layer 13 from being formed on the electrode 10. Conceivable materials of the insulating layers 13, 14 include polyester resin, epoxy resin, polyurethane resin and polyimide resin. Specifically, white epoxy resin with a filler having a nitric property is printed and hardened to form the insulating layers 13 each in the dimensions of 0.2 mm by 0.4 mm with a long side interval of 0.3 mm, a short side interval of 0.2 mm and a thickness of 0.3 mm, and the insulating layers 14 each in the dimensions of 0.2 mm×0.3 mm, a long side interval of 0.6 mm, a short side interval of 0.3 mm and a thickness of 0.3 mm.

Figure 10:
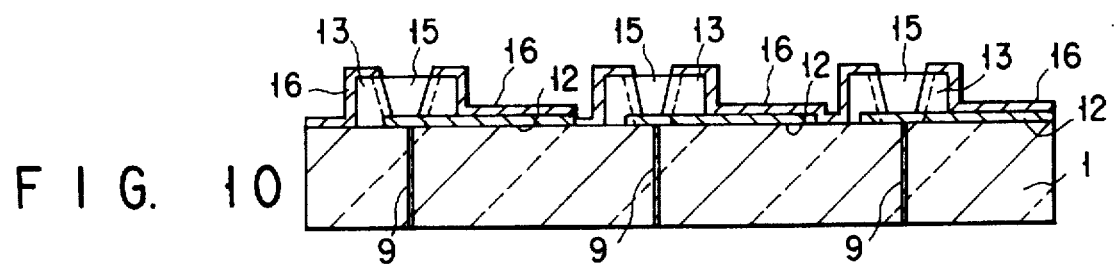
Figure 11:
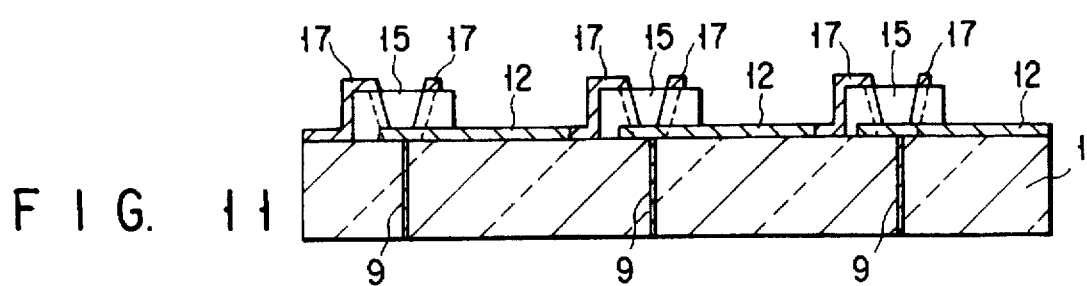
Figure 12:
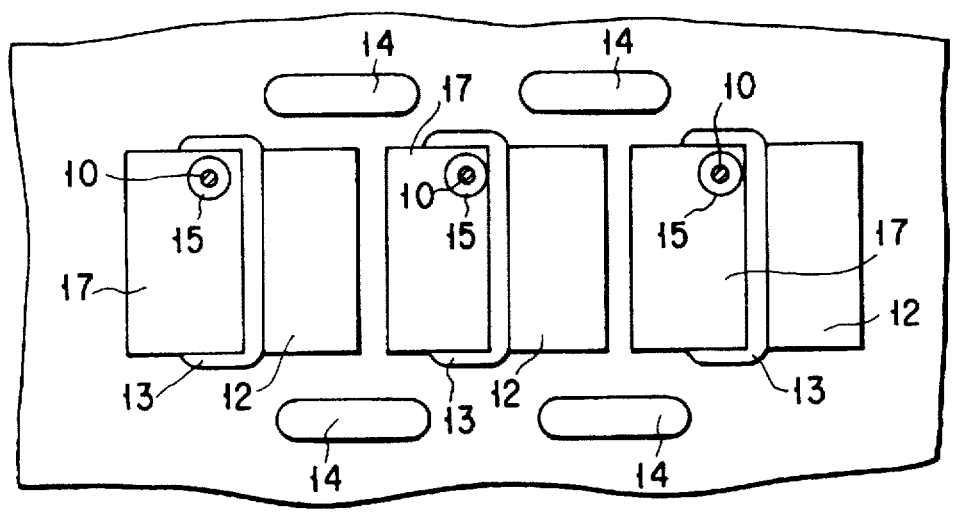

As the next step, as shown in FIG. 10, thin film conductors 16 are formed by sputtering or vapor deposition on the surface of the lower substrate 1 formed with the insulating layers 13, 14. The materials usable for the thin film conductors 16 include copper and nickel, for example. Then, as shown in FIGS. 11 and 12, the thin film conductors 16 are etched to form upper thin film electrodes 17.

Figure 13:
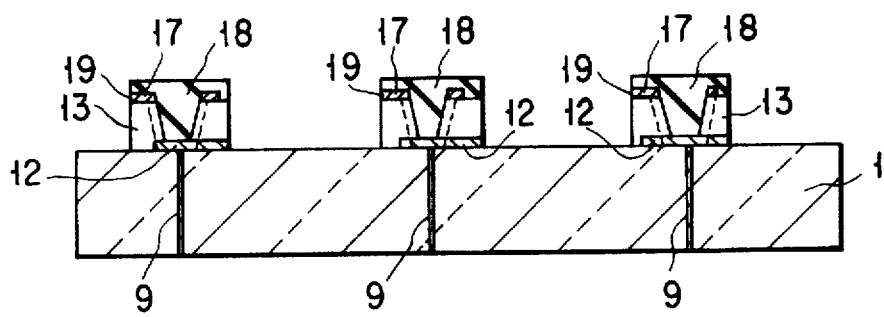
Figure 14:
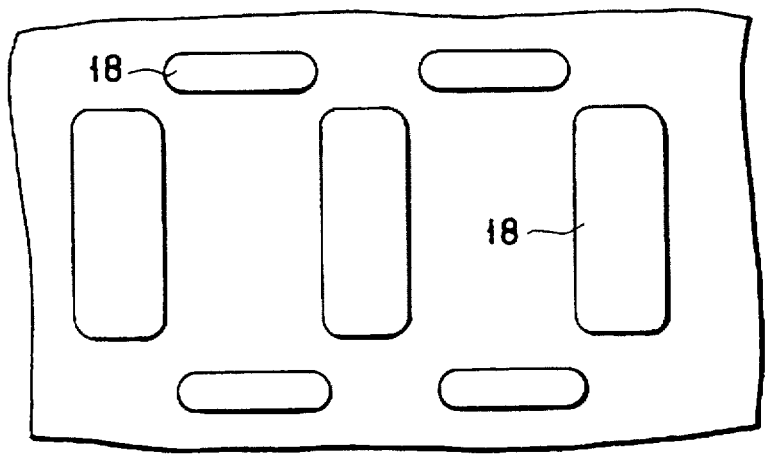

As the next step, as shown in FIGS. 13 and 14, insulating layers 18 are formed by printing or the like on the side walls 13 formed on the upper thin film electrodes 17. The insulating layers 18 are made of such a material as epoxy resin, polyester resin, polyimide resin or polyurethane resin. Specifically, each insulating layer 18 is formed of white epoxy resin coated and hardened in the thickness of 5 μm. After that, the extraneous part of the upper and lower thin film electrodes 12, 17 are etched off, and as shown in FIG. 13, an end surface thus is formed on each of the lower thin film electrodes 12 and the upper thin film electrodes 17.

Figure 15:
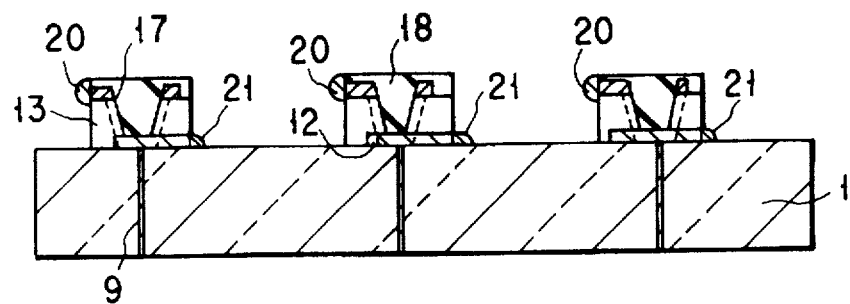
Figure 16:
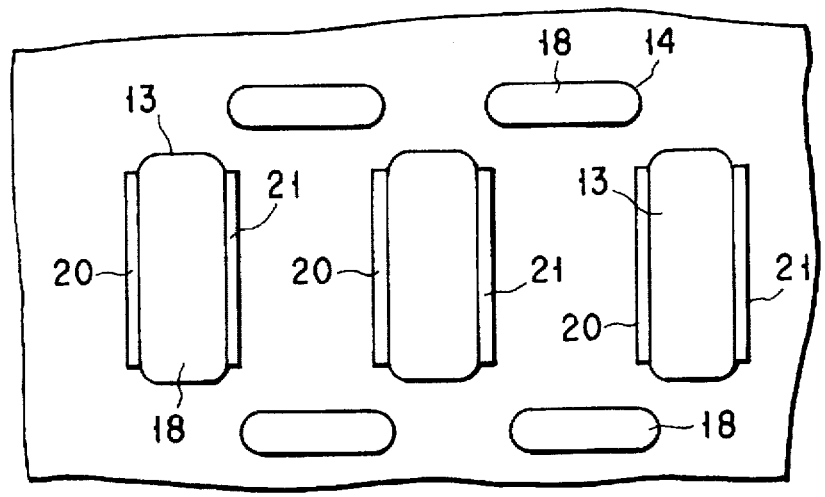

Then, as shown in FIGS. 15 and 16, the substrate is electrically galvanized, so that a corrosion-resistant metal such as nickel, gold or platinum is grown on the end surfaces 19 of the lower thin film electrodes 12 and the upper thin film electrodes 17, thereby forming the upper electrodes 20 and the lower electrodes 21, respectively. In this way, the lower substrate of the display device according to the invention is completed. The reason why the insulating layers 13, 14 are striped is because the liquid injection is facilitated after attaching the upper substrate and the lower substrate to each other and at the same time bubbles are not retained in a corner of a cell.

Now, description will be made about a method of mounting a film-like functional gel as shown in FIG. 1 on the lower substrate prepared in the above-mentioned steps. First, as shown in FIG. 1, a solution of red-eyed acryl resin of polyacryl amide-2-methypropane sulfonic acid having a thickness of 1 μm is printed and dried as an upper substrate on the surface of the upper substrate of glass 0.5 mm thick. In this way, a film-like functional gel 3a and a fibrous gel 3b are formed.

Then, the upper substrate 4 formed with the functional gels 3a, 3b and the lower substrate 1 formed with the electrodes as described above are attached to each other. More specifically, in order to bond the insulating layers 13, 13 constituting the side walls and the upper substrate 4 to each other, white epoxy resin is printed in the thickness of 2 μm as an adhesive at the position on the upper substrate 4 corresponding to the bonding section. Further, the peripheral parts of the upper substrate 4 and the lower substrate 1 are printed with white epoxy resin as a sealing agent. The upper substrate 4 and the lower substrate 1 are overlapped in position, and processed for a network or irradiated with ultraviolet rays, so that the epoxy resin is hardened to bond the upper substrate 4 and the lower substrate 1. In this way, a cell is produced.

Then, a polyester emulsion containing a pyridium surface active agent is injected as a suspension or an emulsion by way of the end surface of the cell prepared as above. To facilitate smooth injection of the emulsion, the end surface opposite to the injection hole is formed with another hole by way of which to reduce the cell interior pressure. After injecting the emulsion, the end holes are sealed with resin. Under this condition, the assembly is left to stand for one day thereby to allow the functional gel resin to swell and gelate. Thus, the film-like functional gel 3a and the fibrous gel 3b are formed to produce a display device according to this embodiment.

While changing the polarities of the upper and lower electrodes of the display device fabricated in this way, the turning on-off is repeated until the red gel submerges in the emulsion and the entire surface is whitened. More specifically, when the voltage is turned on, the film-like functional gel comes into the transparent substrate and exhibits red, while when the voltage is turned off, the red disappears. As long as the voltage is off, a color like paper white is displayed. Further, a sufficient contrast is secured.

According to the present embodiment, the display device can be controlled to switch between the property in which the film-like functional gel is bent to contact the upper substrate, and the property in which the film-like functional gel is bent to contact the lower substrate, by reversing the voltage polarity. Either property can be determined by the direction in which the surface active agent is applied to the functional gel.

According to this embodiment, electrodes for holding the functional gel are formed on the side walls. Instead, electrodes may be formed on the surfaces of the upper and lower substrates with one of the electrodes as a transparent one. A similar operation can thus be achieved with equal effect.

[Embodiment 2]

According to this embodiment, there is provided a display device in which side walls are formed on a substrate, and an end of the film-like functional gel is fixed on a side wall and the voltage polarity is reversed thereby to extend or bend the functional gel. In this case, since an end of the functional gel is fixed, the dyed cell bottom (the surface of the lower substrate) is observed from above when the functional gel bends. When the functional gel extends to hide the cell bottom, on the other hand, the dyed gel is visible.

A configuration of a display device according to this embodiment will be explained with reference to FIGS. 17 to 19. The same component parts in FIGS. 17 to 19 as those in FIGS. 1 to 3 are designated by the same reference numerals respectively, and will not be described in detail.

Side walls 2 surrounding the four sides of each pixel are formed on the lower substrate 1. The portion surrounded by the side walls 2 is formed with the film-like functional gel 3. An end of each film-like functional gel 3 is fixed to one of the side walls 2. The upper substrate 4 is arranged in opposed relation to the lower substrate 1 by means of adhesives 5 formed in the gap therebetween.

Electrodes for applying an electrical signal to the film-like functional gel 3 formed in such positions as to sandwich the film-like functional gel 3. The electrodes include lower electrodes 6 on the lower substrate 1 side and upper electrodes 7 on the upper substrate 4 side of the side walls 2. The surface of the lower substrate 1 is formed with a film 22 dyed with the desired color.

Figure 18:
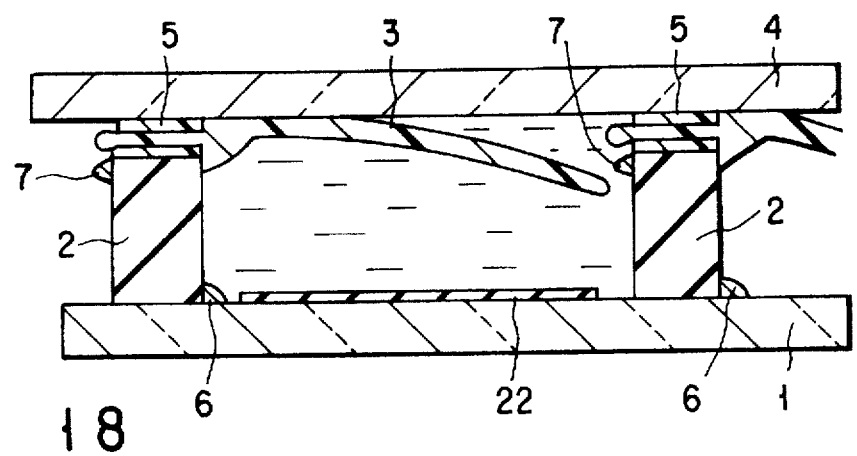
FIG. 18 and 19 are sectional views showing a display device according to the second embodiment of the invention.

In the display device according to this embodiment, when the lower electrode 6 is supplied with a positive voltage and the upper electrode 7 with a negative voltage, the functional gel 3 is distorted, and as shown in FIG. 18, extends toward the upper electrode 4. In the process, observation from above shows that the pixel exhibits the color of the film-like functional gel 3. In the case where a positive voltage is applied to the upper electrode 7 and a negative voltage to the lower electrode 6, on the other hand, the functional gel 3, as shown in FIG. 19, bends toward the fixed side wall 2. At this time, observation from above shows that the pixel exhibits the color of the dyed film 22 formed on the surface of the lower substrate 1.

Figure 19:
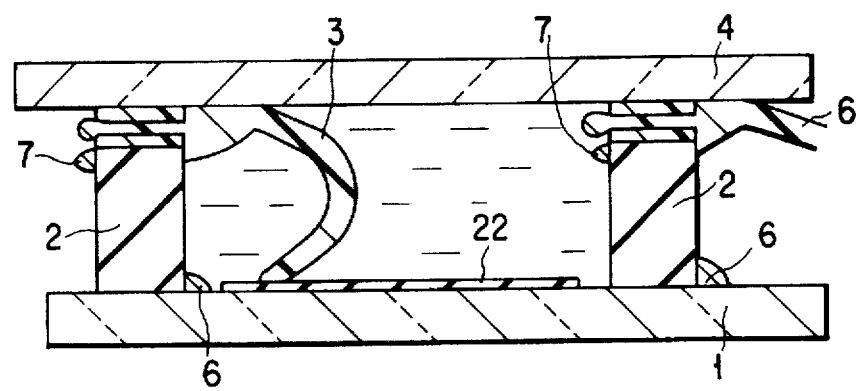

As described above, in the display device according to this embodiment, the polarities of the electrodes are changed or otherwise an electrical signal is applied thereby to switch between the mode in which the dyed gel covers the dyed film formed on the lower substrate (FIG. 18) and the mode in which the dyed gel uncovers the dyed film (FIG. 19). In the covered mode (FIG. 18), the color of the film-like functional gel 3 exhibited, while in the uncovered mode (FIG. 19), the color of the dyed film formed on the lower substrate is presented, thereby displaying an image. The swell amount of the functional gel is regulated the same way as employed in the first embodiment.

Now, a method of manufacturing the display device according to this embodiment will be explained.

The lower substrate used in this embodiment is formed with a dyed film 22 in advance by printing or the like process, and is fabricated in the same manner as in the first embodiment. The dyed film 22 is formed by printing a paint with a dye or a pigment dispersed in the resin. In the case under consideration, a black film is formed using the epoxy resin dispersed with carbon black. The thickness of the insulating layer constituting the side walls is set to 0.4 mm.

Figure 17:
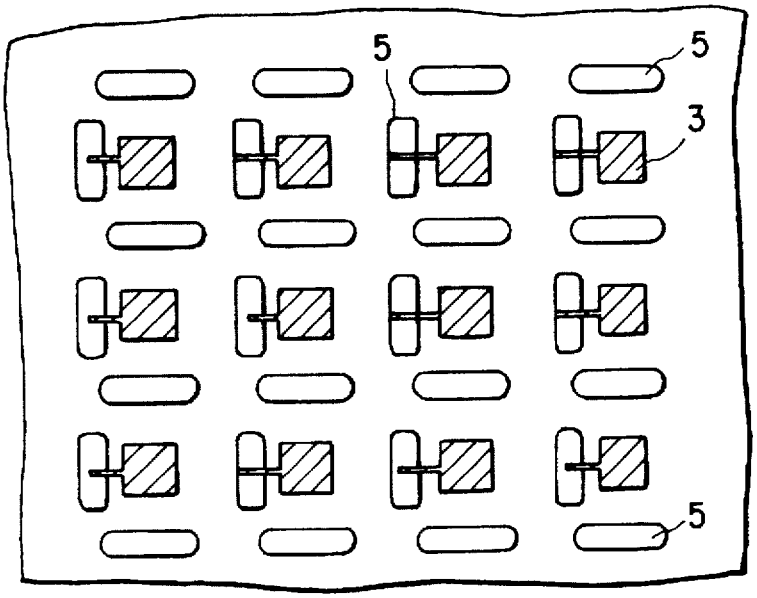
FIG. 17 is a plan view showing a display device according to a second embodiment of the invention.

As the next step, as shown in FIG. 17, the portion of the upper substrate 4 corresponding to the pixel is printed with a 1-μm thick pattern of acrylic resin of polyacryl amide-2-methylpropane sulfonic acid. Then, each of the portions of the upper substrate 4 corresponding to the side walls 2 formed on the lower substrate 1 is printed with white epoxy adhesive 5.

Then, the upper substrate formed with the resin 3 of the film-like functional gel is attached on the lower substrate formed with the electrodes. More specifically, the white epoxy resin is printed as a sealing material on the peripheral portions of the upper substrate 4 and the lower substrate 1. The upper substrate 4 and the lower substrate 1 are then overlapped in position and bonded to each other by hardening the epoxy resin by ultraviolet ray or by heat treatment. The cell is produced in this way.

Then, water containing a surface active agent is injected from the end surface of the cell produced by the above-mentioned method. For the purpose of injection, a hole is formed in the opposite side of the end surface formed with an injection hole, and the cell interior is reduced in pressure by way of the second hole, thereby smoothing water injection. After water injection, the two holes are closed. Under this condition, the assembly is allowed to stand for an hour, so that the resin swells into a gel state. Thus a film-like functional gel 3 with an end fixed is formed to produce a display device according to this embodiment.

When a positive voltage is applied to the lower electrode 6 and a negative voltage to the upper electrode 7 of the display device fabricated in this manner, as shown in FIG. 19, the functional gel 3 bends. As observed from above, the dyed film 22 formed on the lower substrate 1 appears black. In the case where a negative voltage is applied to the lower electrode 6 and a positive voltage to the upper electrode 8, on the other hand, as shown in FIG. 18, the functional gel 3 extends toward the upper substrate thereby to cover the dyed film 22. When an electrical signal for inverting the polarity in 1/30 second is applied between the electrodes taking advantage of this phenomenon, the functional gel repeats the extension and bend, whereby an image can be displayed.

Also, in the display device according to the present embodiment, a white display similar to paper white can be obtained with a sufficient contrast. Also, the drive voltage is 2 to 10V.

According to this embodiment, the electrodes for holding the functional gel is formed n the side walls. A similar operation can be realized also when the electrodes are formed on the surfaces of the upper and lower substrates with one of them transparent.

[Embodiment 3]

According to this embodiment, there is provided a display device, in which a dyed fibrous functional gel in knit or woven (meshed) form is arranged in such a manner as to cover the lower substrate between electrodes formed between a pair of opposed substrates. By applying an electrical signal for changing the polarity or voltage of the electrodes, the fibrous functional gel is expanded or contracted thereby to change the size thereof. When the fabric increases in size, the surface of the lower substrate is covered, while when the fabric is thinned, the lower substrate becomes visible. In this case, a plurality of sheets of the cloth of the fibrous functional gel may be formed in layers taking the light transmissivity into consideration.

Figure 20:
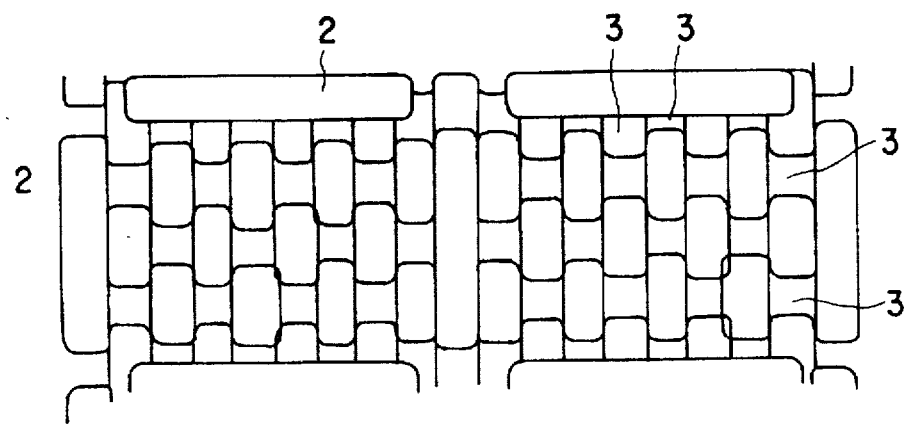
FIG. 20 is a plan view showing a display device according to a third embodiment of the invention.
Figure 21:
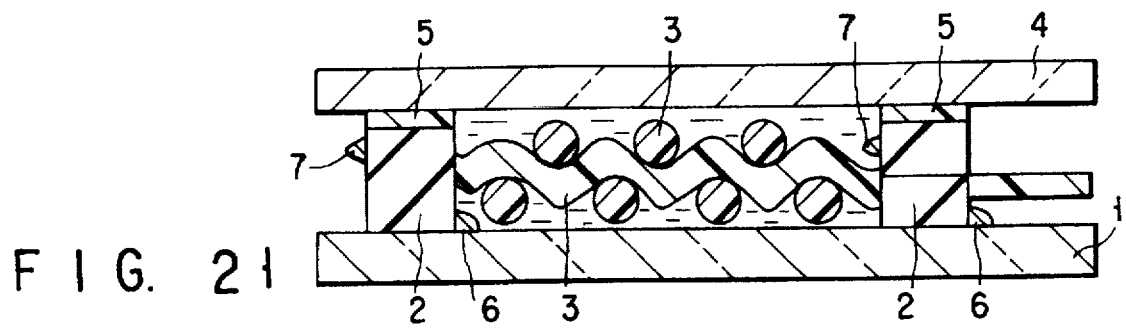
FIGS. 21 and 22 are sectional views showing a display device according to the third embodiment of the invention.
Figure 22:
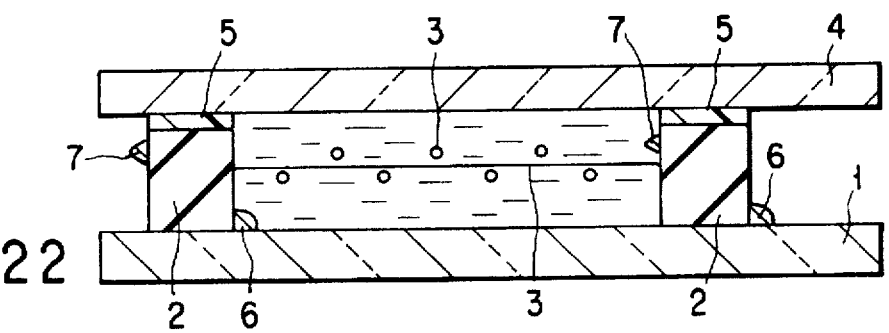

A configuration of a display device according to this embodiment will be described with reference to FIGS. 20 to 22. The component elements identical to those in FIGS. 1 to 3 are designated by the same reference numerals respectively as in the present embodiment, and will not be described in detail any further.

The lower substrate 1 is formed with the side walls 2 surrounding the four sides of each pixel. The portion surrounded by the side walls 2 has arranged therein a cloth formed by knitting the fibrous functional gel 3 therein. The four corners of the cloth are fixed to the side walls 2. The upper substrate 4 is arranged in opposed relation to the lower substrate 1 with a gap therebetween by an adhesive 5 formed by printing or the like process.

The electrodes for applying an electrical signal to the fibrous functional gel 3 formed in such a manner as to sandwich the fibrous functional gel 3 include the lower electrode 6 on the lower substrate 1 side and the upper electrode 7 on the upper substrate 4 side of the side walls. Also, the surface of the lower substrate 1 is dyed with the desired color. The gap between the lower substrate 1 and the upper substrate 4 is injected with an electrolyte for stabilizing the functional gel In the display device according to this embodiment, the functional gel 3 expands and as shown in FIG. 21, the cloth mesh contracts, when no voltage is applied between the lower electrode 6 and the upper electrode 7. At this time, observation from the top shows that the pixel exhibits the color of the fibrous functional gel 3. When a voltage is applied between the lower electrode 6 and the upper electrode 7, on the other hand, the fibrous functional gel 3, as shown in FIG. 22, contracts into a thin state. At this time, the fibrous functional gel, as observed from top, is reduced in size and the mesh hole of the cloth increases, so that the pixel exhibits the color of the surface of the lower substrate 1.

As described above, the display device according to the present embodiment can be switched between the mode in which the dyed film formed on the lower substrate is covered by the dyed fibrous functional gel (FIG. 21) and the mode in which the dyed film is not covered (FIG. 22) depending on the presence or absence of the voltage applied to the electrodes. In this way, the color of the fibrous functional gel 3 is presented in the covered mode (FIG. 1), while the color of the surface of the lower substrate is exhibited in the uncovered mode (FIG. 22), thereby displaying an image.

Now, a method of fabricating the display device according to this embodiment will be explained.

The lower substrate used in this embodiment is made of a substrate with the surface thereof dyed in advance, and is fabricated in the same manner as in the first embodiment. In the case under consideration, a substrate with a black dyed surface is used. The thickness of the insulating layer constituting the side walls is set to 0.2 mm.

As the next step, polyvinyl alcohol-polyacryl amide is prepared in fibrous form and plain woven into cloth. This meshed cloth is dyed red with a dye or a pigment, and interposed between the lower substrate 1 formed of cloth and the upper substrate 4 of glass or the like material. At this time, the cloth mesh apertures are fixedly by an adhesive in such a manner that the side walls 2 are positioned at the cloth mesh holes. The white epoxy resin is used as the adhesive which is printed in the thickness of 0.1 mm on the upper substrate. The white epoxy resin is also printed as a sealing material on the peripheral parts of the upper substrate 4 and the lower substrate 1. After that, the upper substrate 4 and the lower substrate 1 are overlapped in position, and by heat treatment or ultraviolet irradiation, the epoxy resin is hardened and bonded. A cell is produced in this way.

As the next step, salt water is injected by way of an end surface of the cell thus produced. In order to slightly reduce the internal pressure of the cell and secure smooth injection of salt water, another hole is formed in the surface opposite to the injection hole. After salt water is injected, the two holes are closed. The resin woven in mesh is exposed to the salt water and swells into a functional gel.

When an electric field of 5V is applied between the upper electrode 7 and the lower electrode 6 of a display device thus produced, the fibrous functional gel contracts and opens the mesh holes. Upon termination of the application of the electric field, on the other hand, the fibrous functional gel expands to close the mesh holes. As a result, when the mesh holes are closed, the color of the fibrous functional gel is presented, while when the mesh holes are open, the color of the lower substrate 1 is exhibited.

In the display device according to this embodiment, a white color substantially equal to paper white can be displayed with a sufficiently high contrast.

According to this embodiment, the electrodes sandwiching the functional gel are formed on the side walls. Instead, a similar operation can be secured by a configuration in which the electrodes are formed on the surfaces of the upper and lower substrates, one of which is transparent.

[Embodiment 4]

According to this embodiment, there is provided a display device in which a liquid and a particulate functional gel are dispersed in a gel having the same or substantially the same refractive index as the liquid between electrodes formed between a pair of substrates arranged in opposed relation to each other. An electrical signal such as a voltage change is applied, whereby the particulate functional gel expands and contracts. In this case, with the expansion of the particular functional gel, the refractive index of the functional gel substantially coincides with that of the liquid, and the light is transmitted with the result that the surface of the lower substrate emerges. When the particulate functional gel contracts, on the other hand, the difference in refractive index between the liquid and the functional gel causes the light to be scattered and the surface of the lower substrate submerges. The average particle size when the particulate functional gel swells is desirably at least 0.3 μm since the visible light is scattered more.

Figure 23:
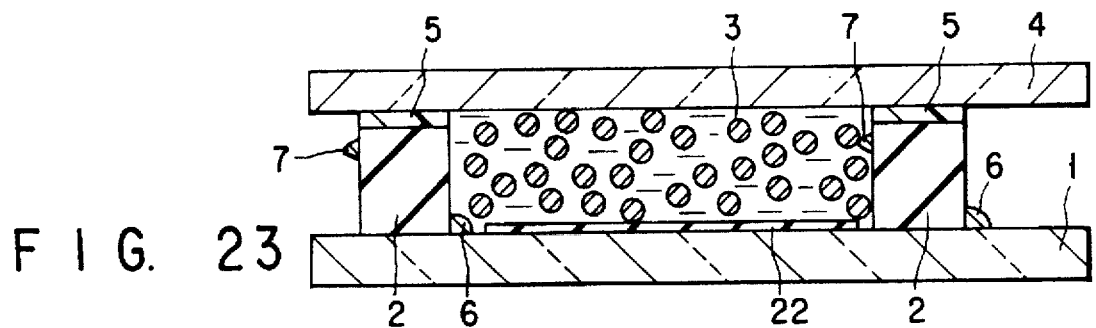
FIGS. 23 and 24 are sectional views showing a display device according to a fourth embodiment of the invention.

A configuration of a display device according to this embodiment will be described with reference to FIGS. 23 and 24. The same component parts as those in FIGS. 17 to 19 are designated by the same reference numerals respectively and will not be described in detail.

The side walls 2 surrounding the four sides of each pixel are formed on the lower substrate 1. The portion surrounded by the side walls 2 has arranged therein a liquid dispersed with a particulate functional gel or a gel capable of absorbing a large amount of liquid. The upper substrate 4 is arranged in opposed relation to the lower substrate 1 with a gap therebetween filled with an adhesive 5 formed by printing or the like.

The electrodes that apply an electrical signal to the particulate functional gel 3 are formed to include the lower electrode 6 on the lower substrate 1 side and the upper electrode 7 on the upper substrate 4 side of the side walls 2 in such positions to sandwich the particulate functional gel 3. Also, the surface of the lower substrate 1 is formed with a film 22 dyed with the desired color.

Figure 24:
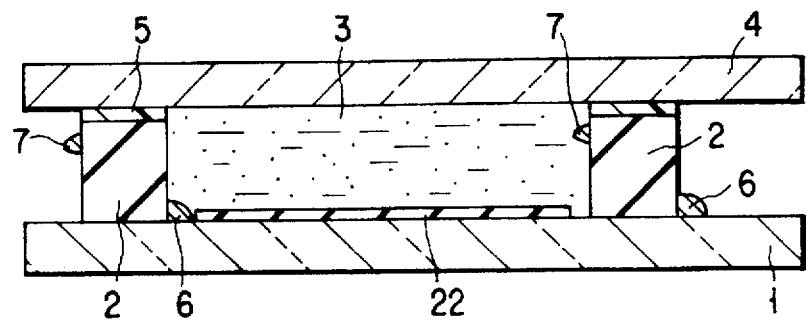

In the display device according to this embodiment, when a voltage is applied between the lower electrode 6 and the upper electrode 7, the particulate functional gel 3 contracts, and as shown in FIG. 24, decreases in grain size. Due to the difference of the refractive index between the particulate functional gel and the medium, the cells are dispersed and become slightly opaque. Upon termination of the voltage application between the lower electrode 6 and the upper electrode 7, the particulate functional gel 3 swells and the grain size thereof increases as shown in FIG. 23. Observation from the top shows that the increased particulate functional gel size renders the refractive index of the particulate functional gel substantially coincide with the refractive index of the liquid, so that the pixel presents the color of the dyed film 22 formed on the surface of the lower substrate 1.

In the display device according to this embodiment, the application of an electrical signal representing an change in electrode polarity, for example, reduces the size of the particulate functional gel. As a result, it becomes possible to switch between the mode in which the light is scattered due to the difference of refractive index between the particulate functional gel and the liquid (FIG. 24) and the mode in which the particulate functional gel increases in size to such an extent that the refractive index of the particulate functional gel substantially coincides with that of the liquid (FIG. 23). As a result, in the light scattering mode (FIG. 23), the liquid crystal becomes slightly opaque, while in the transmission mode (FIG. 24), the color of the dyed film 22 formed on the surface of the lower substrate is presented, thereby to display an image. In the transmission mode, an increased amount of the particulate functional gels increases the gel capacity at the time of gel contraction, resulting in a larger refractive index and hence a larger scattering ratio. Also, according to this embodiment, there is provided a display device, in which the gel color is presented when the gel expands, while when the gel is contracted, the color of the cell bottom is observed.

Now, a method of fabricating a display device according to this embodiment will be explained.

The lower substrate used in the present embodiment is produced by the same method as in the second embodiment. The lower substrate and the upper substrate of glass or the like material are attached to each other. In other words, white epoxy resin, which is used as an adhesive, is printed on side walls 2 μm thick. The white epoxy resin is printed also as a sealing material on the peripheral edges of the upper substrate 4 and the lower substrate 1. Then, the upper substrate 4 and the lower substrate 1 are overlapped in registry with each other, and the epoxy resin is hardened and bonded by heat treatment or irradiation of ultraviolet rays. A cell is produced in this way.

Then, a transparent gel is dispersed in water as a medium. In the process, a small amount of resin constituting a particulate functional gel is added to make a mixture solution. After gelation, this small amount of resin is required to have substantially the same refractive index as the transparent gel. Specifically, this mixture liquid is produced by mixing the polyacryl amide gel expanded in volume by a factor of about 20 from the grain size of 1 to 3 μm after gelation and a 5% starch solution (transparent gel) at 50°.

Then, this mixture solution is injected into the cell. When this mixture solution cools, the resin is gelated into a functional gel, resulting in a smaller fluidity. In this case, the fluidity is desirably increased by heating. After that, the gel is cooled to 10° C. or less, and left to stand for one day, with the result that the functional gel is uniformly dispersed and fixed in the cell. The display device according to this embodiment is produced in the manner described above.

In the display device produced in the above-mentioned manner, the refractive index of the particulate functional gel substantially coincides with that of the transparent gel when the particulate gel expands. When the particulate functional gel expands, therefore, the interior of the cell becomes transparent, thereby presenting the color of the dyed film 22 formed in the cell bottom. When an electrical signal with the polarity or the voltage thereof changed is applied between the upper electrode 7 and the lower electrode 6, on the other hand, the particulate functional gel contracts for an increased resin density. As a result, the refractive index of the particulate functional gel exceeds that of the transparent gel, so that light is scattered to make the cell interior slightly opaque. Specifically, in the display device according to this embodiment, when a voltage of 5V is applied with the cell interior transparent, the cell becomes slightly opaque, so that the black color of the dyed film 22 becomes invisible. When the voltage application is stopped, on the other hand, the cell interior becomes transparent and the black becomes visible.

In the display device according to this embodiment, white display color like paper white is realized with a sufficiently high contrast.

According to this embodiment, the electrodes sandwiching the functional gel are formed on the side walls. The same operation is possible, however, in the case where the electrodes are formed on the surfaces of the upper substrate and the lower substrate with one of them as a transparent electrode.

[Embodiment 5]

According to this embodiment, there is provided a display device in which a liquid with dispersed particles is supplied between the electrodes formed between a pair of substrates arranged in opposed relation to each other, and the voltage applied between the electrodes is changed thereby to coagulate and disperse the particles. In the case where the particles are dispersed in the liquid and sufficiently small in size, the light in visible range is not scattered. In the case where the particles coagulate and gelated particles are generated, on the other hand, the apparent grain size increases and the light is scattered to cause a slightly opaque condition. An apparently transparent ionomer emulsion with an average grain size of 0.3 μm or less can be used as such a liquid with the particles dispersed.

A configuration of the display device according to this embodiment will be explained with reference to FIGS. 25 and 26. The same component parts as in FIGS. 17 to 19 are designated by the same reference numerals respectively and will not be described in detail.

Side walls 2 are formed to surround the four sides of each pixel on the lower substrate 1. The portion surrounded by the side walls 2 is injected with a liquid dispersed with a particulate functional gel of a comparatively large refractive index. The upper substrate 4 is arranged in opposed relation to the lower substrate 1 with a gap formed therebetween by an adhesive 5 arranged by printing or the like process.

The electrodes for applying an electrical signal to the particulate functional gel 3 are disposed to sandwich the particulate functional gel 3 and include the lower electrode 6 formed on the lower substrate 1 side and the upper electrode 7 formed on the upper substrate 4 side of the side walls 2. Also, the surface of the lower substrate 1 is formed with a film 22 dyed with the desired color.

In the display device according to this embodiment, when a voltage is applied between the lower electrode 6 and the upper electrode 7, the particles 3 coagulate, and as shown in FIG. 25, the mass of the coagulated particles (in gel state) forms a gelated particle large in size. At the same time, the cell interior becomes slightly opaque due to the difference in refractive index between the gelated particles and the medium. When the voltage application between the lower electrode 6 and the upper electrode 7 is stopped, on the other hand, the gelated particles are decomposed, so that the particles 3, as shown in FIG. 26, are uniformly dispersed in the solvent. At this time, the pixel, as observed from the top, presents the color of the dyed film 22 formed on the surface of the lower substrate.

As described above, in the display device according to this embodiment, upon application of an electrical signal for changing the electrode polarity or otherwise, the particles coagulate into gelated state. It thus becomes possible to switch between the mode in which the particles coagulate into gelated state so that the light is scattered due to the refractive index difference between the solvent and the gelated particles (FIG. 25) and the mode in which the particles are dispersed so that the refractive index of the solve substantially coincides with that of the gelated particles thereby to transmit the light (FIG. 26). In the light scattered mode (FIG. 25), the liquid crystal slight becomes slightly opaque, while the color of the dyed film 22 formed on the surface of the lower substrate is presented in the transmissible mode (FIG. 26), thereby making it possible to display an image.

Now, a method of fabricating a display device according to this embodiment will be described. The lower substrate used in this embodiment is produced in the same way as in the second embodiment. Then, the lower substrate is attached to the upper substrate made of glass or the like. Specifically, white epoxy resin is used as an adhesive and printed on the side walls in the thickness of 2 μm. The white epoxy resin is also printed as a sealing material on the peripheral edges of the upper substrate 4 and the lower substrate 1. The upper substrate 4 and the lower substrate 1 are then overlapped on each other in position. The epoxy resin is hardened for bonding the two substrates by heat treatment or irradiation of ultraviolet rays. A cell is produced in this way.

As the next step, resin particles of 0.3 μm or less in average grain size are dispersed in water as a medium to produce a mixture solution. At the same time, by appropriately selecting the type of the solvent or the resin particles, it is possible to realize the state in which the resin particles are uniformly dispersed in the solvent and the state in which the resin particles coagulate with each other with the gelated particles dispersed. More specifically, water is used as a solvent, and the ionomer resin material with the grain size of 0.05 to 0.2 μm is dispersed. Then, the mixture solution is injected into the cell. In this way, the display device according to this embodiment is fabricated.

In the display device fabricated this way, an electrical signal with the polarity or voltage thereof changed is applied to the upper electrode 7 and the lower electrode 6, so that the resin particles coagulate and the gelated mass is dispersed in the solvent. Under this condition, the light incident on the cell is irregularly reflected in the cell and assumes white color as viewed from the direction of light incidence. When the application of the electric field is stopped, the resin particles are dispersed uniformly in the solvent. At this time, the light incident on the cell is transmitted through the cell, and therefore the color of the dyed film 22 formed on the surface of the lower substrate is presented. More specifically, the display device according the present embodiment is such that upon application of a 5V voltage to the electrodes with the cell interior slightly opaque, the slight opaqueness in the cell disappears and the dyed film 22 appears black. When the voltage application is stopped, on the other hand, the cell interior becomes slightly opaque and the black disappears.

In the display device according to this embodiment, a color like paper white is realized with a sufficiently high contrast.

According to this embodiment, although the electrodes for sandwiching the functional gel are formed on the side walls, a similar operation can be realized when the electrodes is alternatively formed on the surfaces of the upper substrate and the lower substrate with one of the electrodes in transparent form.

[Embodiment 6]

According to this particular embodiment, there is provided a display device in which a functional gel is arranged around each pixel and adapted to expand toward the pixel center in response to an electrical signal applied thereto, thereby displaying an image. More specifically, the display section exhibits the color of the cell bottom when the functional gel is present around the pixel, while when the functional gel swells up to the central portion of the pixel, the gel color is presented.

First, a configuration of a display device according to this embodiment will be explained with reference to FIG. 27.

A functional gel 33 is arranged on the peripheral portion of a pixel 31 surrounded by side walls 32. This pixel is composed of a cell defined by a lower substrate 34, an upper substrate 35 and the side walls 32. The surface of the lower substrate 34 is formed with a pixel electrode and a switching device (not shown) connected to the pixel electrode. The upper substrate, on the other hand, is formed with a transparent electrode making up a common electrode.

In the display device according to this embodiment, the functional gel is colored white and the lower substrate surface black, or the functional gel is colored black and the surface of the lower substrate white, thereby constituting a black-and-white display device. Also, a color filter may be provided on the lower substrate, and the functional gel (of light scattering type or light absorption type) for each pixel is used as a shutter. As another alternative, the functional gels are colored red, green, blue, yellow, cyan and magenta, while the cell bottom is colored black or white, thereby realizing the color display.

Now, a method of fabricating a display device according to this embodiment will be explained.

First, a switching device and a transparent electrode are built in the lower substrate. The transparent electrode is made of a material such as ITO (Indium-Tin Oxide), for example, and is formed by sputtering. The side walls 32 are formed by printing or the like process. Then, the functional gel 33 is dyed by a dye or a pigment is dispersed in the functional gel thereby to obtain a desired color. This functional gel 33 is connected to the side walls 32.

The material of the functional gel used in the present embodiment may have a hydrophilic or a lipophilic property. Hydrophilic gels include a crosslinked polyacrylic acid group, isobutylene/maleic acid base group, starch/polyacrylic acid base group, PVA/polyacrylic acid base group, hydrolyzed acrylic fiber group, crosslinked PVA group, acrylic acid sodium polymer group, acrylic acid soda polymer, starch-acrylic acid graft copolymer, ethylene oxide polymer, carboxyl methylcellulose polymer, starch-acrylonitrile graft polymer and acrylic acid base-acrylic amide copolymer. The lipophilic gels, on the other hand, includes polystylene and the like.

The lower substrate produced as described above is attached to the upper substrate formed with the transparent electrode using ITO. The work of attaching the upper substrate and the lower substrate to each other is performed in the same manner as in the above-mentioned embodiment. Then, the electrolyte or the like is injected into the cell.

In the display device according to the present embodiment, assume that the functional gel is colored black and the surface of the lower substrate white. Upon application of a voltage thereto, the functional gel expands to display white, while when the voltage application is stopped, the functional gel is restored (contracted) to black. The response speed is 30 ms and the contrast is 10:1. The contrast depends on the density of the black color element contained in the functional gel. The higher the density, the higher the contrast. In the case where the density is excessively high, however, the behavior of the functional gel is suppressed to affect the response speed. Also, by providing a sufficient time to apply a voltage (write time), on the other hand, the contrast can be increased (18:1 for 100 ms).

With the display device according to this embodiment, the relation between the area change of the functional gel and the voltage application time is such that the longer the voltage application time, the larger the area change of the functional gel. As a result, the response speed and contrast are so correlated such that with the increase in response speed (a shorter write time), the contrast decreases, while the lower the response speed (longer write time), the higher the contrast. It is therefore necessary to adjust the response speed and the contrast as required.

[Embodiment 7]

Figure 28:
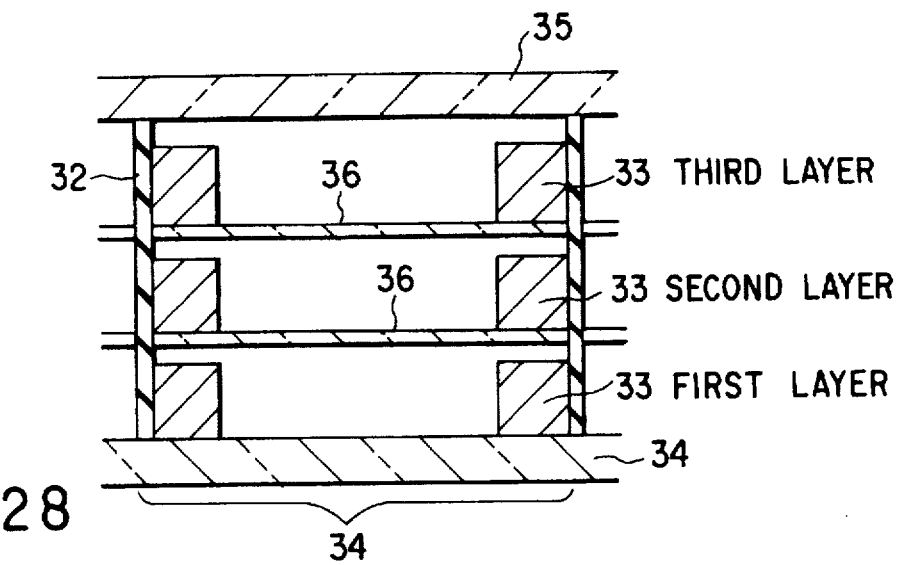
FIG. 28 is a sectional view showing a display device according to a seventh embodiment of the invention.

According to this embodiment, three cells identical to those used in the sixth embodiment are prepared. The respective cells are arranged with light-transmissible functional gels colored yellow, cyan and magenta, respectively. A color display device is constructed with the three cells deposited in layers. The display device according to this embodiment is fabricated basically in the same manner and with the same materials as the display device of the sixth embodiment. The color display device according to this embodiment, as shown in FIG. 28, is basically realized by a structure comprising three layers of cells used in the sixth embodiment.

First, a configuration of the display device according to this embodiment will be explained with reference to FIG. 28. The same component parts in the present embodiment as in FIG. 27 are designated by the same reference numerals respectively and will not be described in detail.

The first, second and third layers of cells are deposited on a lower substrate 34. Each cell is separated by an internal board 36. Functional gels are arranged around a pixel 31, i.e., in such a manner as to be connected to side walls 32 defining the pixel. Light-transmissible functional gels colored yellow, cyan and magenta are arranged in the first, second and third layers, respectively.

In the display device according to this embodiment, the functional gels are dyed with the respective colors, so that when a voltage is applied thereto, each functional gel expands to display the dyed color, while when the voltage is turned off, the functional gel restores the original colorless state (contracts). As a result, a superior color display is achieved. More specifically, yellow, cyan, magenta, red, green, blue, black and white can be displayed with a single pixel, and therefore a clear color display with a high contrast is made possible. Although the functional gels are dyed in three colors of yellow, cyan and magenta, red is obtained by subtractive color mixture of yellow and magenta, green by subtractive color mixture of yellow and cyan, blue by subtractive color mixture of magenta and cyan, and black by subtractive color mixture of yellow, cyan and magenta. White can be displayed by contracting all the three layers of the functional gels. Also, instead of using yellow, cyan and magenta as colors attached to the light-scattering functional gels, the light-scattering functional gels may be colored red, green and blue.

[Embodiment 8]

According to this embodiment, there is provided a display device, in which each pixel is formed in a cylinder filled with a functional gel. The gel moves to the cylinder bottom at the time of contraction, while the gel emerges in the cylinder opening at the time of expansion, thereby displaying an image. More specifically, in this display device, in the case where the functional gel contracts and hides in the cylinder, the color of the opening (which appears blackish in this case) is displayed, while when the functional gel expands and emerges in the opening, the color of the functional gel is presented.

Figure 29:
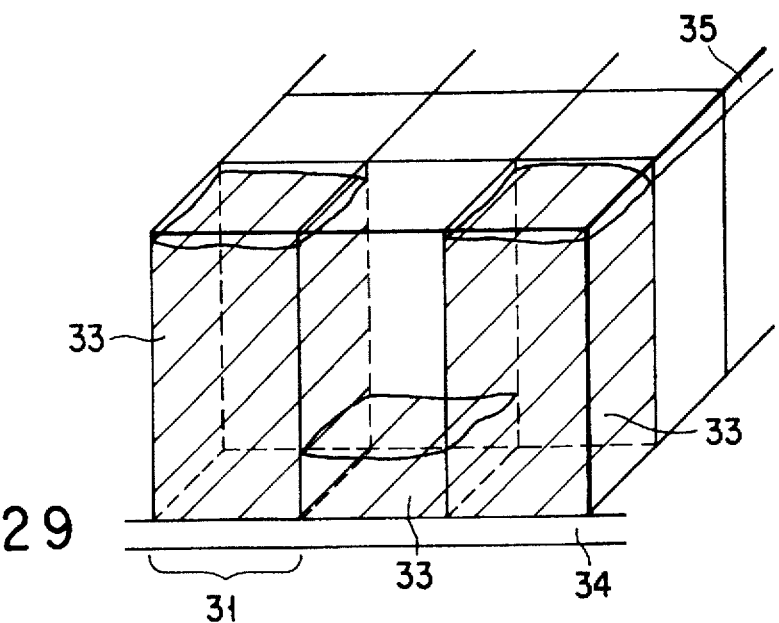
FIG. 29 is a perspective view of a display device according to an eighth embodiment of the invention.

First, a configuration of the display device according to this embodiment will be explained with reference to FIG. 29. The same components parts in FIG. 29 as in FIG. 27 are designated by the same reference numerals as the corresponding parts in FIG. 27 and will not be described in detail any further.

Cylindrical pixels 31 are formed between a lower substrate 34 and an upper substrate 35. Each cylindrical pixel 31 is filled with a functional gel 33 of a specified color. The lower substrate 34 is formed with a pixel electrode and a switching device (not shown) connected with the pixel electrode for each pixel. The upper substrate 35, on the other hand, is formed with a transparent electrode (not shown) constituting a common electrode over the entire surface thereof.

In the display device according to this embodiment, the cylinder opening is colored black, and the functional gels are colored white thereby to display black and white. In other words, when a voltage is applied between the electrodes, the functional gel swells up to the cylinder opening whereby the pixel displays white, while when the voltage is turned off, the functional gel contracts so that the pixel displays black.

Now, a method of fabricating a display device according to the present embodiment will be described.

The lower substrate 34 is produced in the same way as in the sixth embodiment, with the functional gels being formed one each for each pixel on the lower substrate by printing. Side walls are formed in a grid by printing in such positions as to surround the functional gel of each pixel. The lower substrate 34 obtained in this manner is attached onto an upper substrate 35 formed with a transparent electrode thereon. Each pixel is injected with an electrolyte or the like. The display device fabricated this way has a response speed of 10 ms and a contrast of 10:1.

Figure 30:
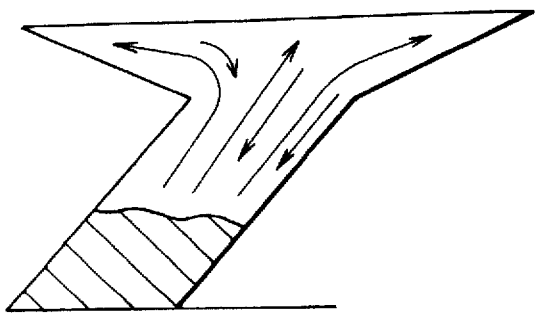
FIG. 30 is an enlarged view of a cylinder of a display device according to the eighth embodiment of the invention.

The cylindrical pixel may be formed, as shown in FIG. 30, with a large opening and a small cylinder bottom. In this structure, at the time of black display with the gel contracted, the light reflected from the functional gel rarely leaks out of the cylindrical structure. Also, at the time of gel expansion, a reflection surface is obtained which is composed of a functional gel of a larger area. As a result of this effect, the contrast can be improved to 30:1.

[Embodiment 9]

The display device according to this embodiment is a modification of the eighth embodiment.

First, a configuration of the display device according to this embodiment will be explained with reference to FIG. 31. The same component parts in FIG. 31 as those in FIG. 29 are designated by the same reference numerals as the corresponding parts in FIG. 29, respectively, and will not be described in detail any further.

Cylindrical pixels 31 are formed on a lower substrate 34. Each of the cylindrical pixels 31 is filled with a functional gel 33. The difference of this embodiment from the eighth embodiment is that the forward end of the functional gel is formed with a microfilm 51 of white or the desired color. The lower substrate 34 is formed with a pixel electrode and a switching device (not shown) connected to the pixel electrode for each pixel.

In this display device, when a voltage is applied between the electrodes, the functional gel is expanded and the microfilm 51 displays the color of the microfilm as it is located in the cylinder opening. When the voltage supply is stopped, on the other hand, the functional gel contracts and is held in the cylinder, so that the reflectance is reduced and black is displayed.

The display device according to this embodiment is fabricated in the same manner as in the eighth embodiment except that the microfilm 51 is formed at the forward end of the functional gel by grafting. Grafting is performed by subjecting the microfilm 51 to a treatment and graft polymerizing using a gel precusor.

[Embodiment 10]

According to this embodiment, there is provided a display device, in which particles of a functional gel are dispersed on a black-absorbing material or a color filter, and the grain sizes of the particulates are changed thereby to display an image. Specifically, light is transmitted in the case where the size of the gel particulates is larger than the wavelength of the visual light, while light is scattered when the size of the gel particulates is in the wavelength range of the visual light. An image is displayed taking advantage of this light transmission and scattering characteristic.

First, a configuration of the display device according to this embodiment will be explained with reference to FIGS. 32A and 32B. The same component parts as those in FIG. 27 are designated by the same reference numerals respectively and will not be described in detail.

Particulates of a functional gel are arranged in a pixel 31 surrounded by side walls 32 formed on a lower substrate 34. This functional gel has a grain size almost equal to the wavelength of the visual light when no voltage is applied. Under such a condition, light is scattered and white is displayed. When a voltage is applied to an electrode 36 formed on the lower substrate 34, the gel particulates swell and the size thereof increases sufficiently larger than the wavelength of the visual light area. Light thus passes through the gel particulates, thereby displaying the color attached on the surface of the lower substrate 34. Display is also possible by coloring the gel particulates themselves. Also, in order to improve the scattering property, particulates of a polymer or an inorganic material with an average size about or less than the wavelength of the visual light may be used in a form mixed with the gel particulates.

In fabricating the display device according to this embodiment, a lower substrate and materials similar to those of the sixth embodiment are used. Like the sixth embodiment, the side walls are formed by printing. The lower substrate and the upper substrate are attached one on the other to produce a cell, into which an electrolyte or the like is injected. The gel particulates are applied on the substrate by printing or by spin-coating in a form dispersed in an appropriate solvent.

The display device according to this embodiment has a response speed of 20 ms and a contrast of 12:1. Also, in the case where the gel particulates are mixed with polymer particulates 0.2 μm or less in average grain size at 10 weight %, the scattering performance for white display is so remarkably improved as to produce a contrast of 25:1.

[Embodiment 11]

According to this embodiment, there is provided a display device in which a plurality of microfilms each having a size of about 200 µm by 200 µm with a functional gel fixed on a part thereof are arranged in matrix on a substrate, and the functional gels are extended or bent by an electrical signal to open or close the area of the microfilm. In other words, the functional gel is extended or bent so that the microfilm surface is positioned parallel or perpendicular to the substrate surface. Specifically, assume the case where the microfilm is colored white. When the functional gel is extended, the microfilm surface becomes substantially parallel with the substrate surface to display white. When the functional gel is bent, on the other hand, the microfilm surface becomes substantially perpendicular to the substrate surface to present the color of the substrate (black in this case). The functional gel is driven (extended or bent) by applying an electrical signal of a voltage or the like thereto through an electrolyte.

Figure 33:
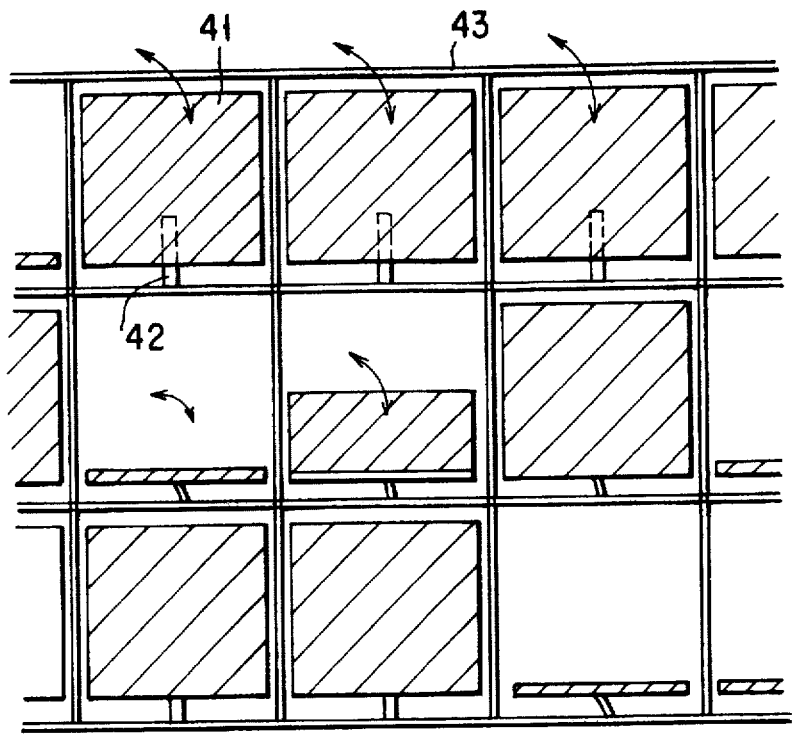
FIG. 33 is a plan view showing a display device according to an 11th embodiment of the invention.

A configuration of the display device according to this embodiment will be explained with reference to FIG. 33.

Side walls 43 are formed on a lower substrate in the same manner as in the above-mentioned embodiments. A pixel area is defined by the side walls 43. An end of a functional gel bar 42 is mounted on one the side walls 43. A microfilm 41 of a size corresponding to the pixel area is mounted on the other end of the functional gel 42. In this case, the microfilm 41 is adapted to cover the pixel area when the functional gel bar 42 is in straight form. What is called an artificial muscle or the like with a gel bar covered with a gel film may be used as the functional gel bar. This functional gel bar contains an electrolyte in such a manner as not to leak out, and is adapted to extend or bend upon application of an electrical signal thereto.

In the display device according to this embodiment, the microfilm 41 is colored white, and the surface of the lower substrate is colored black, for example. When an electrical signal is applied to the functional gel, the functional gel bar 42 bends and the microfilm 41 rises upright in a position substantially perpendicular to the substrate surface, so that the substrate surface presents black. When no electrical signal is applied to the functional gel bar 42, on the other hand, i.e., when the functional gel bar 42 is in extended state, the microfilm 41 assumes a position substantially parallel with the substrate surface and covers the pixel area, thereby presenting white.

In this display device, it is also possible to form a reflection layer on the substrate surface and the microfilm 41 is colored black to display black and white. Also, in order to increase the transfer speed of the microfilm 41, the driving force such as magnetism or electrostatic force may be used at the same time.

The functional gel bar 42 such as a minuscule artificial muscle used with the display device according to this embodiment is fabricated by covering a bar-shaped composite gel of polyvinyl alcohol-polyacrylic acid with a polyvinyl alcohol gel film containing sodium carbonate, for example. Also, an electrical signal can be applied to the functional gel by supplying it to an electrode buried in the polyvinyl alcohol gel film. The other materials and other steps of the method of fabricating the functional gel are identical to those for the sixth embodiment. The display device according to this embodiment has a response speed of 30 ms and a reflectance of 90% or more for white display.

[Embodiment 12]

According to the present embodiment, there is provided a display device in which a functional gel is fixed on a part of a microfilm in the manner similar to the 11th embodiment and an image is displayed using the extension and bending of the functional gel. In the display device according to this embodiment, a microfilm covering a given pixel area is stored in an adjacent pixel area.

Figure 34A:
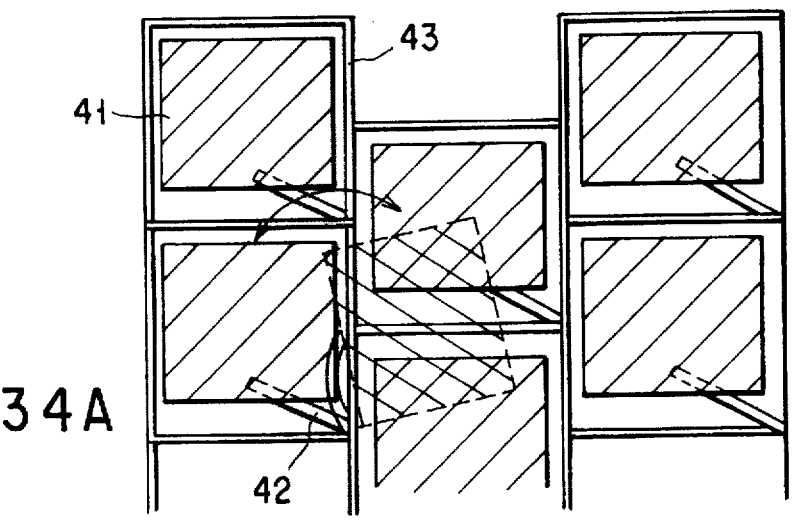
FIGS. 34A and 34B are views showing a display device according to a 12th embodiment of the invention.
Figure 34B:
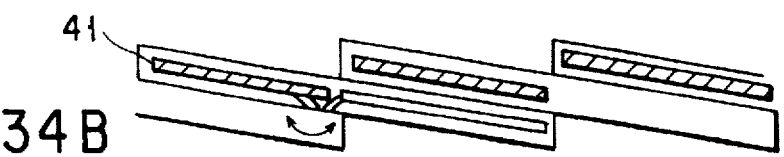

A configuration of a display device according to the present embodiment will be described with reference to FIGS. 34A and 34B. The same component parts in FIGS. 34A and 34B as those shown in FIG. 33 are designated by the same reference numerals, respectively, as in FIG. 33 and will not be described in detail.

In the same manner as in the previous embodiment, side walls 43 are formed on a lower substrate. Each pixel area is defined by the side walls 43. The pixel areas are formed stepwise as shown in FIGS. 34A and 34B, and a space for storing a microfilm covering an adjacent pixel area is arranged under each pixel area. This configuration is shown in the plan view of FIGS. 34A and 34B illustrating an arrangement of the pixel areas.

The side walls 43 have mounted thereon an end of a functional gel bar 42. The other end of the functional gel bar 42 has mounted thereon a microfilm 41 of a size corresponding to the pixel area. In the case under consideration, the microfilm 41 is so set as to cover the pixel area with the functional gel bar 42 being in straight form. The functional gel bar 42 is similar to the one used in the 11th embodiment.

In the display device according to this embodiment, assume, for example, that the microfilm 41 is colored white and the surface of the lower substrate black. When an electrical signal is applied to the functional gel bar 42, the functional gel bar 42 is bent, so that the microfilm 41 is stored under the adjacent pixel area, thereby displaying the black of the substrate surface. When an electrical signal is not applied to the functional gel bar 42, i.e., when the functional gel bar 42 is extended, on the other hand, it covers the pixel area thereby to display white.

Also, the display device according to this embodiment, in which a reflection layer is formed on the substrate surface, is capable of displaying black and white by coloring the microfilm 41 black. In order to increase the transfer speed of the microfilm 41, the driving force such as magnetic force or electrostatic force may be used at the same time.

Figure 35:
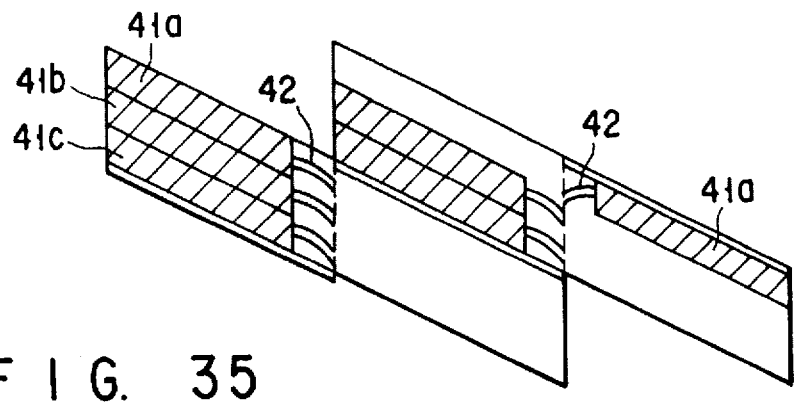
FIG. 35 is a perspective view of the essential parts of a display device according to the 12th embodiment of the invention.

Further, in the display device according to this embodiment, as shown in FIG. 35, a plurality (three, in this case) of microfilms 41a to 41c of different colors such as yellow, cyan and magenta may be connected to the side walls 42 by the functional gels, and are separately driven to attain a full-color display. As a result, the colors of yellow, cyan, magenta, red, green, blue, black and white can be displayed with a single pixel. A bright, clear display thus is made possible.

The display device according to this embodiment is fabricated by the same method as the 11th embodiment, except that in this embodiment a space for storing the microfilm 41 is arranged under the pixel area of the lower substrate and that the direction of bending the functional gel 42 is set horizontal to the substrate.

[Embodiment 13]

According to this embodiment, there is provided a display device, in which a contractible film or a curtain-like film is fixed on the peripheral part of the pixel, and this film is moved to open and close the pixel using a functional gel.

Figure 36:
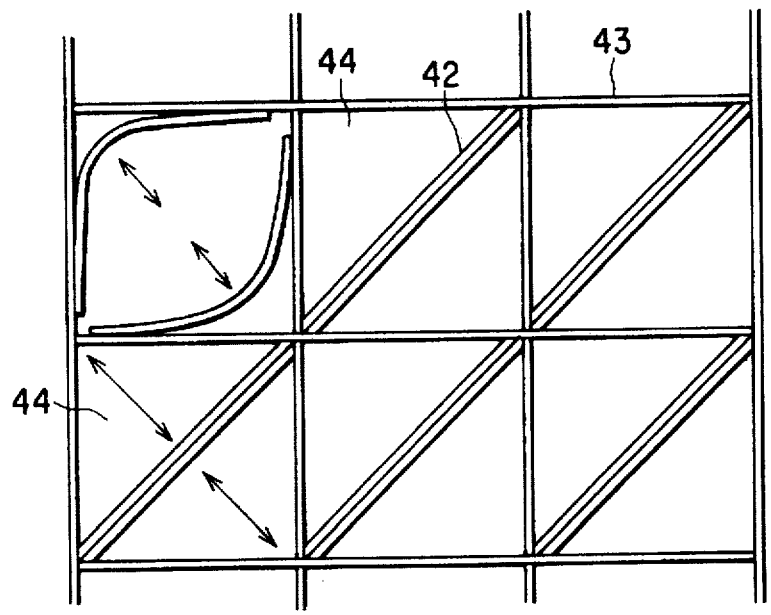
FIG. 36 is a plan view showing a display device according to a 13th embodiment of the invention.

A configuration of the display device according to this embodiment will be explained with reference to FIG. 36. The same component parts in FIG. 36 as those in FIG. 33 are designated by the same reference numerals respectively and will not be described in detail.

As in the aforementioned embodiment, side walls 43 are formed on a lower substrate. Each pixel area is defined by the side walls 43. Substantially triangular contractible or curtain-like films 44 are fixed along the contour defined for each pixel area. Also, functional gels 42 adapted to extend or bend are fixed along the diagonal of each pixel area. In the display device of this configuration, assume that the functional gels are bent in response to an electrical signal. The films 44 are pushed aside and the pixel area opens thereby to display the color of the cell bottom. In the case where the functional gels extend, by contrast, the films 44 return to the initial position so that the color of the films 44 is displayed The same functional gel as used in the 11th embodiment can be used for the present embodiment.

In the display device according to this embodiment, assume the films 44 are colored white and the surface of the lower substrate black. The functional gel bars 42, when supplied with an electrical signal, are bent and the films 44 are pushed aside toward the side walls 43 defining the pixel area, thereby displaying the black of the substrate surface. Also, in the case where no electrical signal is applied to the functional gel bars 42, i.e., when the functional gels 42 are in extended state, on the other hand, the films 44 return to the initial state of expansion and come to cover the pixel area thereby to display white.

Also, in the display device according to this embodiment, a reflection layer may be formed on the substrate surface and the film 44 is colored black to display a black-and-white image. In such a case, a black-and-white display with a high contrast is realized. Also, in order to increase the transfer speed of the microfilm 41, a driving force such as magnetic force or electrostatic force may be used in addition.

Further, in the display device according to this embodiment, a plurality of colored films each connected to a functional gel are deposited in layers thereby to form a film 44. Alternatively, a film of a different hue is used for each pixel area thereby to display a color image. A reflection-type color display is made possible, for example, by a structure in which a film 44 is configured of a plurality of films colored yellow, cyan and magenta in each pixel area. As another alternative, the substrate surface is colored in different hues for different pixel areas, and the film 44 is colored white or black thereby to display a color image. In this case, the film 44 may alternatively be colored yellow, cyan and magenta as in the previous case.

The method of fabricating the display device according to this embodiment is identical to the one of the 11th embodiment, except that in this embodiment functional gel bars 42 are arranged along the diagonal of each pixel area, that a space for storing the microfilm 41 is provided under the pixel area and that contractible or curtain-like films 44 are arranged on the functional gel bars 42 and the side walls 43.

In this case, a pair of closely attached functional gel bars 42 such as an artificial muscle is connected to the side walls 43 along the diagonal of the pixel area. A film 44 is attached over the entire surface of the substrate. The side walls 43 and the artificial muscle are connected to each other by thermal bonding. As the next step, the artificial muscle is cut along it into a pair of artificial muscle bars.

[Embodiment 14]

According to the present embodiment, there is provided a display device in which contractible or curtain-like films are fixed around the pixel as in the 13th embodiment and the films are moved to open or close the pixel using the functional gel.

Figure 37:
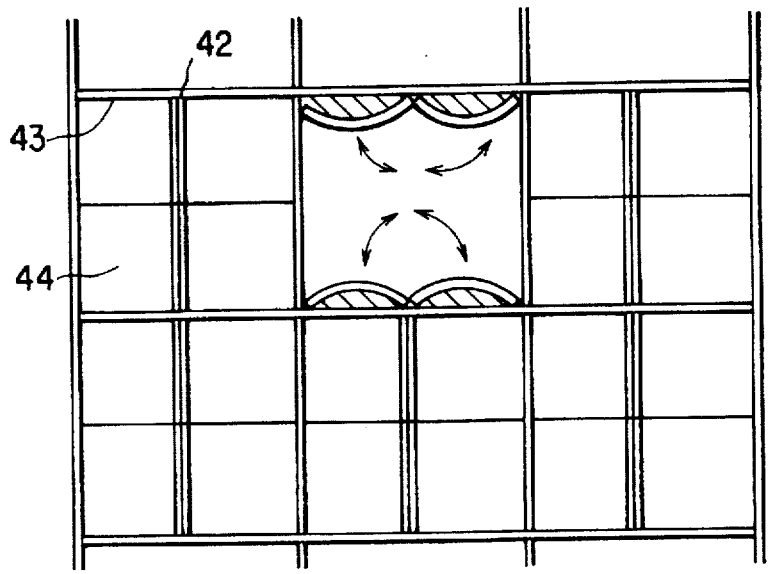
FIG. 37 is a plan view showing a display device according to a 14th embodiment of the invention.

A configuration of the display device according to this embodiment will be explained with reference to FIG. 37.

The same component parts in FIG. 37 as those in FIG. 36 will be designated by the same reference numerals as in FIG. 36 respectively and will not be described in detail below.

As in the foregoing embodiment, side walls 43 are formed in matrix on the lower substrate. The side walls 43 define a pixel area. Four substantially rectangular contractible or curtain-like films 44 are fixed along the contour of the pixel area. A functional gel 42 adapted to extend and bend is fixed along a side of the film. In the display device having this configuration, assume that the functional gel is bent by an electrical signal. The film 44 is pushed open thereby to open the pixel area, and the color of the cell bottom is displayed. In the case where the functional gel extends, on the other hand, the film 44 restores the initial state thereby to display the color of the film 44. The functional gel 42 may be the same as the one used in the 11th embodiment.

In the display device according to this embodiment, assume that the film 44 is colored white and the surface of the lower substrate black. Upon application of an electrical signal thereto, the functional gel bar 42 is bent and the film 44 is pushed open toward the side walls 43 defining the pixel area, whereby to display the black of the substrate surface. Also, when no electrical signal is applied to the functional gel bar 42, i.e., when the functional gel 42 is extended, the film 44 is restored to the initial expanded state and covers the pixel area thereby to display white.

Also, in the display device according to this embodiment, a reflection layer may be formed on the surface of the substrate and the film 44 colored black thereby to display a black-and-white image. In this case, a black-and-white display can be realized with a high contrast. In order to improve the transfer speed of the microfilm 41, the driving force such as magnetic force or electrostatic force may be used at the same time.

Further, the display device according to this embodiment can realize a color display by depositing a plurality of colored films in layers each connected with a functional gel to form the film 44 or by using films of different hues for different pixel areas. For example, a film 44 composed of a plurality of films colored yellow, cyan and magenta is formed in each pixel area, thereby making possible a reflection-type color display. As an alternative, different hues are colored for different pixel areas of the substrate surface, and the film 44 thus is colored white or black thereby to display a color image. In this case, the film 44 may be colored yellow, cyan and magenta as described above.

The method of fabricating the display device according to this embodiment is the same as that of the 13th embodiment except that in this embodiment the contractible or curtain-like film 44 and the functional gel 42 are arranged differently from those in the previous embodiment.

[Embodiment 15]

According to this embodiment, there is provided a display device in which a plurality of microfilms with a functional gel fixed on a part thereof are arranged in matrix and each functional gel is expanded or contracted by an electrical signal, so that each microfilm is stored under an adjacent pixel area or taken out from under the adjacent pixel area thereby to display an image.

Figure 38A:
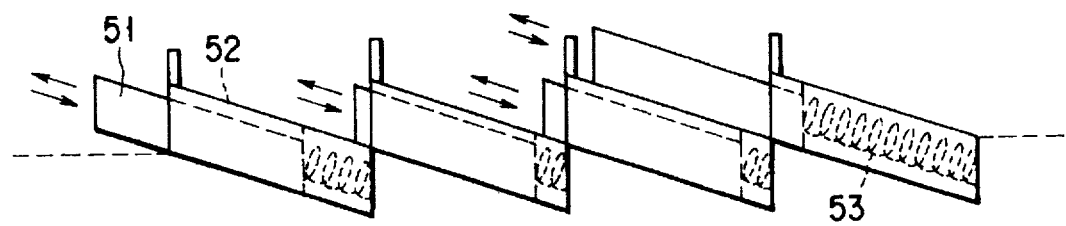
FIGS. 38A and 38B are views of a display device according to a 15th embodiment of the invention.
Figure 38B:
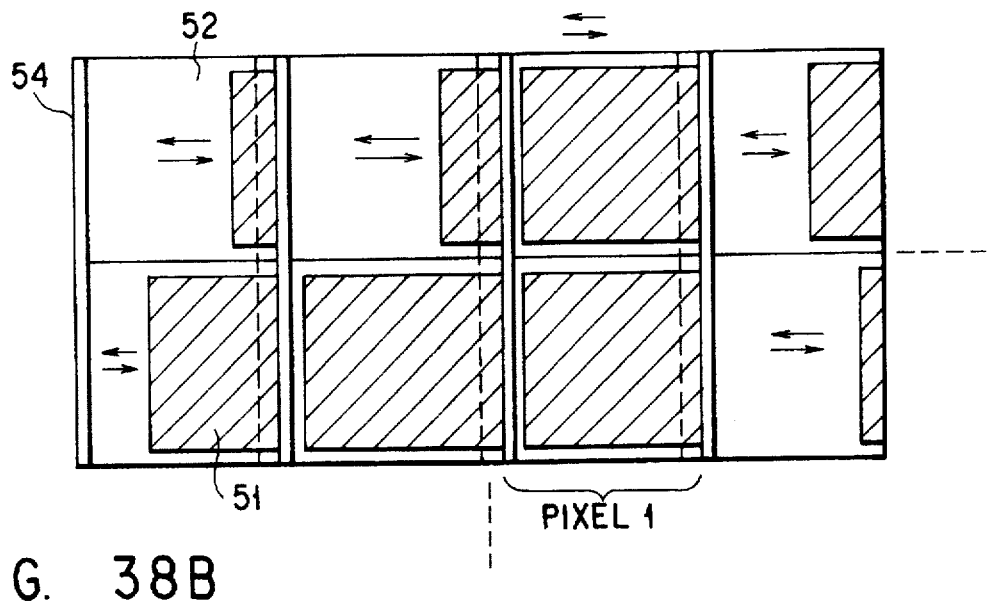

A configuration of the display device according to this embodiment will be explained with reference to FIGS. 38A and 38B.

As in the aforementioned embodiment, side walls 54 are formed on the lower substrate. Each pixel area is defined by the side walls 54. The pixel areas, as viewed in section, are formed in steps as shown in FIGS. 38A and 38B. A space for storing a microfilm 51 covering the adjacent pixel area is arranged under each pixel area.

An end of a spiral functional gel 53 is mounted in this space. The microfilm 51 of a size corresponding to the pixel area is mounted on the other end of the functional gel 53. In this case, the microfilm 51 is set to be stored under the adjacent pixel area when the spiral functional gel 53 is contracted. The functional gel 53 is preferably composed of an assembly of particulates of 1 µm or less in order to increase the volume change response. Specifically, an artificial muscle may be used for the functional gel 53 as in the 11th embodiment. In this case, in order to increase the response speed, it is desirable to use as minuscule artificial muscle as possible.

In the display device according to this embodiment, in the case where the microfilm 51 is colored white and the surface of the lower substrate black, for example, the spiral functional gel 53 expands upon application of an electrical signal thereto, so that the microfilm 51 covers the pixel area thereby to display white. In the case where no electrical signal is applied to the spiral functional gel 53, on the other hand, the functional gel 53 shrinks with the result that the microfilm 51 is stored under the adjacent pixel area thereby to display the black of the substrate surface.

The display device according to the present embodiment, on which a reflection layer may be formed on the substrate surface, is capable of displaying a black-and-white image by coloring black the microfilm 51. Also, in order to increase the transfer speed of the microfilm 51, the driving force such as the magnetic force or electrostatic force may be used at the same time.

Figure 39:
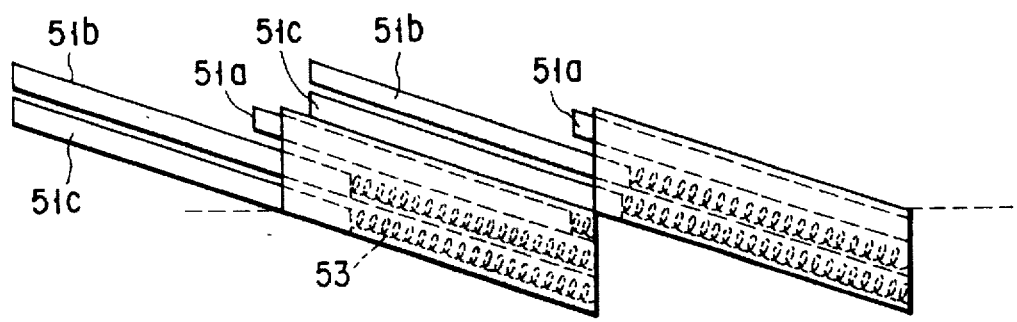
FIG. 39 is a sectional view showing another example of the display device according to the 15th embodiment of the invention.

Further, the display device according to this embodiment, as shown in FIG. 39, is such that a plurality of (three, in this case) light-transmissible microfilms 51a to 51c of different colors including yellow, cyan and magenta are connected to the side walls 54 respectively by the functional gel. The microfilms 51a to 51c thus are driven individually thereby to display a full-color image. Also, as shown in FIG. 40, a plurality of microfilms of different colors including red, green and blue arranged in juxtaposition may be used to display a color image.

In the display device according to this embodiment, the spiral functional gel 53 such as a minuscule artificial muscle is fabricated by covering a spiral composite gel of polyvinyl alcohol-polyacrylic acid with a polyvinyl alcohol gel film containing sodium carbonate. An end of the spiral artificial muscle is mounted by means of grafting on the walls constituting the space for storing the microfilm 51, and the other end of the artificial muscle on the microfilm 51 by grafting.

[Embodiment 16]

According to this embodiment, there is provided a display device in which a microfilm is connected to the side walls in such a manner as to swing, and a movable end of the microfilm is connected to an expansible/contractible functional gel. The reflectance of the incident light is changed with the angle of the microfilm surface with respect to the substrate surface in operatively interlocked relation with the expansion/contraction of the functional gel.

A configuration of the display device according to this embodiment will be explained with reference to FIG. 41.

Side walls 54 are formed on the lower substrate as in the above-mentioned cases thereby to define a pixel area. The side walls 54 have a sufficient height to form a space permitting the microfilm 54 to swing. The side walls 54 are also formed with flanges for fixing the microfilm 51. One of the flanges is formed with a hinge (connector) 53 constituting a fulcrum (fixed end) on which the microfilm 51 is to swing. An end of the expansible/contractible functional gel 53 is mounted on the movable end of the microfilm 51, and the other end of the expansible/contractible functional gel 53 has mounted thereon the other flange. The hinge (connector) 55 can be formed by grafting. Also, the functional gel 53 may be mounted on the microfilm 51 and the flanges of the side walls 54 by grafting.

In the display device according to this embodiment, the microfilm 51 is colored white or a predetermined color, for example. By application of an electrical signal to the functional gel 53, the functional gel 53 expands. The microfilm 51 swings with the surface thereof tilting to assume an angle to the substrate surface. As a consequence, the reflectance of the microfilm 51 against the incident light is reduced thereby to display black. In the case where the functional gel 53 is not supplied with an electrical signal, on the other hand, the functional gel 53 contracts so that the microfilm 51 swings to a position substantially parallel to the substrate surface. The color of the microfilm 51 thus is displayed.

In order to increase the transfer speed of the microfilm 51, the driving force such as the magnetic force or the electrostatic force may be used at the same time. For example, the microfilm is configured of a ferromagnetic material or a ferromagnetic material is dispersed on the microfilm with a magnet arranged on the substrate surface. In this case, the functional gel 53 quickly expands due to the magnetic force, so that the functional gel 53 has the highest response speed under a predetermined load. Also, when the functional gel 53 contracts, the reactive force due to the magnetic force constitutes an appropriate load thereby to increase the contraction speed.

[Embodiment 17]

The display device according to this embodiment is a modification of the 16th embodiment.

A configuration of the display device according to this embodiment will be described with reference to FIG. 42. The same component elements as those in FIG. 41 are designated by the same reference numerals respectively and will not be described in detail.

A pair of flanges on the side walls is formed with a pair of hinges (connectors) 55 constituting fulcrums (fixed ends) for swinging motion of two microfilms 51. An expansible/contractible functional gel 53 is mounted on each of the movable ends of the two microfilms 51 to which the two microfilms 51 are coupled. The hinges (connector) 55 are formed and the functional gel 53 is mounted on the microfilm 51 or the flanges of the side walls 54 in the same manner as in the 16th embodiment.

In the display device according to this embodiment, assume that the microfilms 51 is white or in a predetermined color. By applying an electrical signal to the functional gel 53, the functional gel 53 expands and the distance between the two microfilms 51 increases. Then the two microfilms swing and the surfaces thereof tilt thereby to form an angle with respect to the substrate surface. As a result, the reflectance of the microfilms 51 against the incident light decreases to display black. In the case where no electrical signal is applied to the functional gel 53, on the other hand, the functional gel 53 shrinks so that the distance between the two microfilms 51 decreases. The two microfilms 51 thus swing with the surfaces thereof assuming an angle substantially parallel to the substrate surface. The color of the microfilms 51 thus is presented.

[Embodiment 18]

According to the present embodiment, there is provided a display device in which a functional gel thin film having a small hole is fixed for each pixel and the hole of the thin film is opened or closed by an electrical signal.

Figure 43:
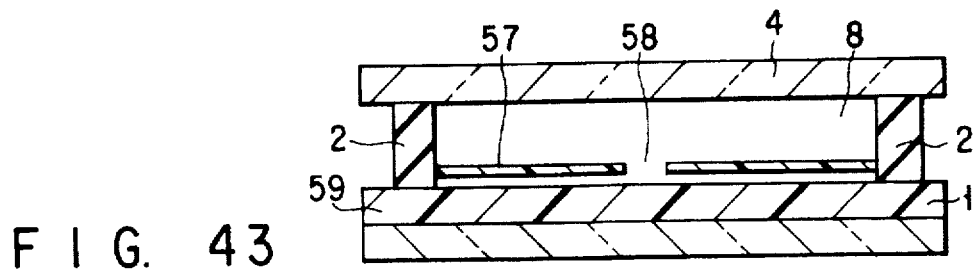
FIGS. 43 and 47 to 51 are sectional views showing a display device according to an 18th embodiment of the invention.
Figure 44:
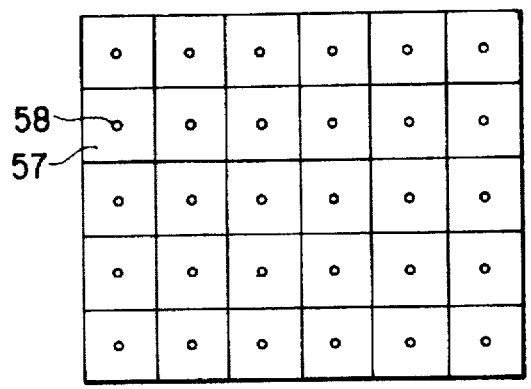
FIG. 44 is a plan view showing the display device according to the 18th embodiment of the invention.

A configuration of the display device according to this embodiment will be described with reference to FIGS. 43 and 44.

As in the aforementioned embodiments, a color filter 59 is formed on a lower substrate 1, and side walls 2 are formed thereon to define a pixel area. A functional gel thin film 57 is attached to the side walls 2 in such a manner as to cover the pixel area. A hole 58 is formed at the central portion of each functional gel thin film 57. The hole 58 is adapted to change in size according to the expansion or contraction of the functional gel.

Figure 45:
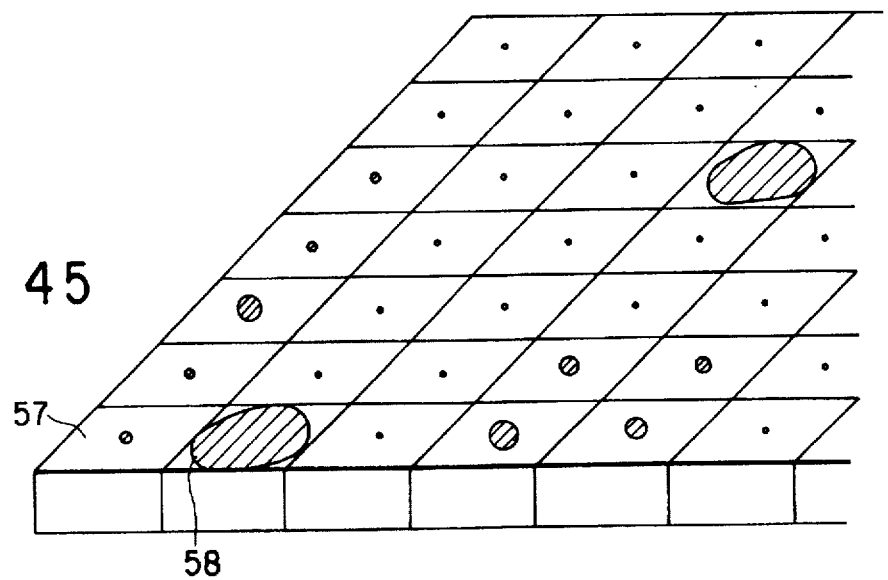
FIG. 45 is a perspective view of the display device according to the 18th embodiment.
Figure 46:
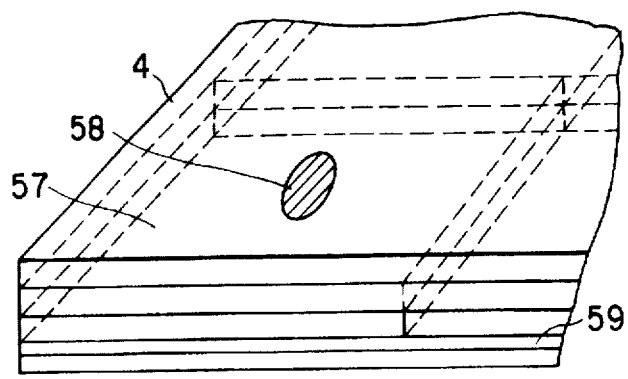
FIG. 46 is an enlarged perspective view of a picture element or a pixel of the display device according to the 18th embodiment of the invention.

In the display device according to this embodiment, suppose that the functional gel thin film 57 is colored white, for example. Upon application of a voltage thereto, the functional gel contracts and the hole 58 expands thereby to present the color of the color filter. In the case where the voltage application to the functional gel thin film 57 is stopped, on the other hand, the hole 58 is reduced in size by the expansion of the functional gel. As a result, the functional gel thin film 57 displays white. Tones can be displayed if the size of the hole 58 of the functional gel thin film 57 is regulated in advance. More specifically, as shown in FIGS. 45 and 46, each hole 58 is located substantially at the center of the functional gel thin film 57. When a voltage is applied to the functional gel, the gel shrinks and the hole 58 expands, whereby the color of the color filter 59 is presented.

Figure 47:
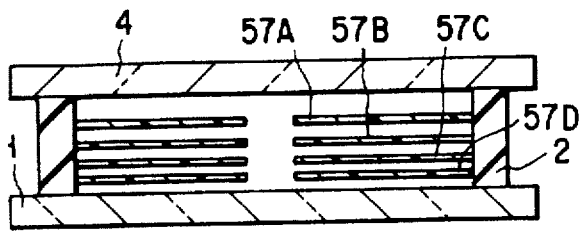
Figure 48:
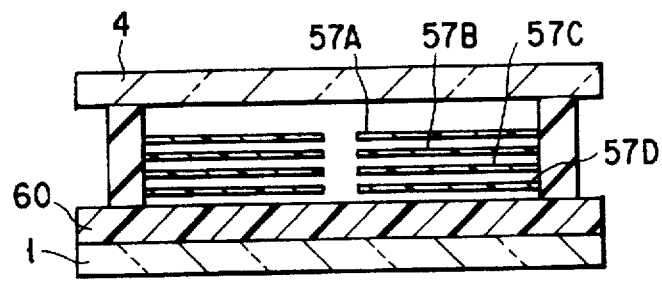

The display device according to this embodiment may use a light-transmissible or a light-scatterable functional gel thin film colored white 57A, yellow 57B, cyan 57C and magenta 57d, as shown in FIG. 47. With this configuration, all the colors including white, black, red, green, blue, yellow, cyan and magenta can be displayed with a single pixel. Also, as shown in FIG. 48, a black color filter 60 may additionally be disposed on the lower substrate 1. This configuration is effective in the case of increasing the contrast.

Figure 49:
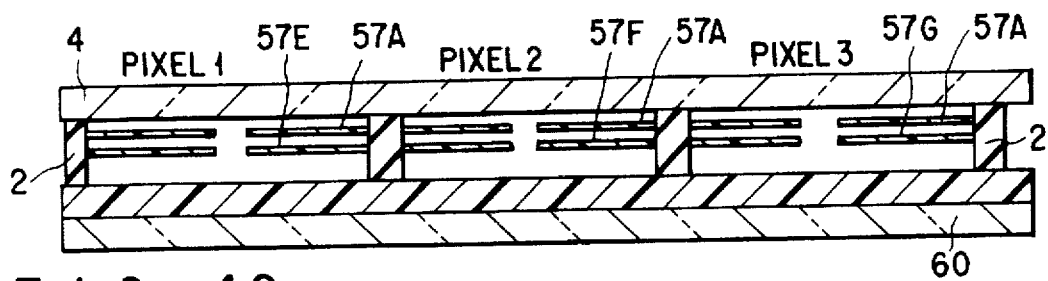

As another alternative, as shown in FIG. 49, the functional gel thin film may be structured in double layers of white 57A/red 57E for pixel 1, white 57A/blue 57F for pixel 2, and white 57A/green 57G for pixel 3, while at the same time disposing a black color filter 60 on the lower substrate 1. This configuration is effective in the case of increasing the contrast.

Figure 50:
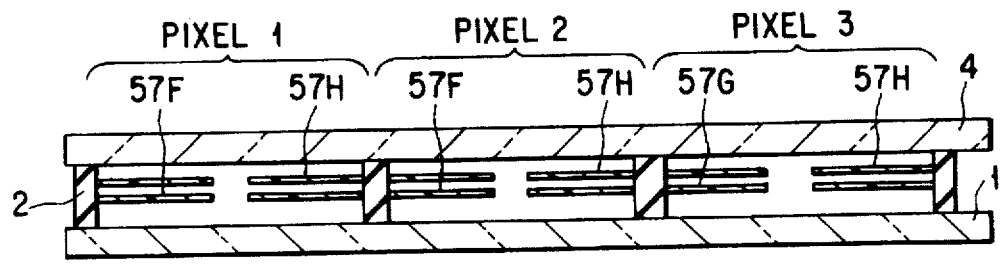
Figure 51:
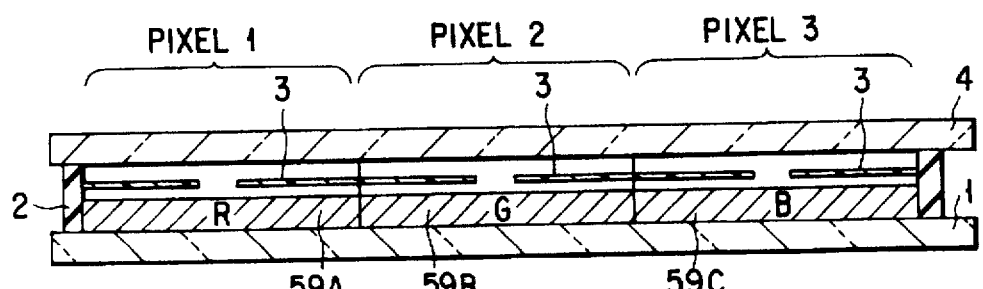

As shown in FIG. 50, the functional gel thin film may be structured in double layers of black 57H/red 57E for pixel 1, black 57H/blue 57F for pixel 2, and black 57H/green 57G for pixel 3, while at the same time forming a reflection layer (not shown) on the lower substrate 1. As still another alternative, as shown in FIG. 51, a black-colored functional gel thin film 57H may be used with a color filter having areas of red 59A, blue 59B and green 59C on the lower substrate 1.

In any of the above-mentioned cases, the electrodes are disposed to sandwich the functional gel thin film. For example, transparent electrodes are mounted on the upper substrate 4 and the lower substrate 1. Also, the functional gel thin film may be made of a hydrophilic or a lipophilic material as described above.

Now, a method of fabricating the display device according to this embodiment will be described.

First, a thin film of an electrically responsive gel (functional gel) is produced using a hydrophilic gel of crosslinked polyacrylic acid group, and is fixed on the outer periphery of a 200 μm×200 μm pixel. A circular hole 5 μm in radius is formed in the central part of the thin film pixel, and the functional gel is colored white by printing.

The lower substrate is colored black by printing in advance. Electrodes are mounted in opposed relation to each other on the upper and lower substrates. With the upper and lower substrates placed in opposed relation to each other, a cell is assembled. An electrolyte is filled between the two substrates and caused to impregnate the functional gel thin film thereby to complete a display device according to the present embodiment.

In the display device thus fabricated, a voltage of 10V is applied. The functional gel thin film contracts and the hole area increases thereby to present the color of the lower substrate. When the voltage application is stopped, on the other hand, the functional gel thin film expands to the original size thereby to present the white color of the functional gel thin film.

[Embodiment 19]

As shown in FIG. 52, functional gel particulates of acrylic amide group are dispersed and adsorbed on the surface of pigment particulates about 10 μm in average grain size, and the resulting assembly is dispersed in an electrolyte. Three types of pigment particulates of red, green and blue are used.

An electrode is formed on a lower substrate by the method mentioned already above, on which three areas of red, green and blue are formed in juxtaposition. Further, an upper electrode carrying an electrode is formed by the method already mentioned above. The upper and lower electrodes are attached to each other thereby to produce a cell in the same manner as in the foregoing embodiments. Each area of this cell is injected with an electrolyte containing red, green and blue pigment particulates thereby to produce a display device according to this embodiment.

A voltage is applied between the electrodes of this display device and by thus deforming (expanding or contracting) the functional gel, a superior color display is obtained. In this case, the reflectance for white display is not less than 70% with a contrast of about 3 with respect to black display. The relation between the conditions of the functional gel and the displayed color is shown in Table 1 below.

TABLE 1

| Red Area | Green Area | Blue Area | Displayed Color |
|---|---|---|---|
| Expansion | Expansion | Expansion | White |
| Contraction | Expansion | Expansion | Red |
| Expansion | Contraction | Expansion | Green |
| Expansion | Expansion | Contraction | Blue |
| Contraction | Contraction | Expansion | Yellow |
| Contraction | Expansion | Contraction | Magenta |
| Expansion | Contraction | Contraction | Cyan |
| Contraction | Contraction | Contraction | Black |

[Embodiment 20]

As shown in FIGS. 53A and 53B, functional gel particulates of acrylic amide group are dispersed and adsorbed on the surface of the pigment particulates about 10 μm in average grain size, and the resulting assembly is dispersed in an electrolyte. Three types of pigment particulates of red, green and blue are used.

Using this electrolyte, as in the case of the 19th embodiment, a display device according to the present embodiment is produced. When a voltage is applied between the electrodes of this display device and the functional gel is deformed (expanded or contracted), a superior color display is obtained. In this case, the reflectance of white display is not less than 70%, with a contrast of about 3 with black display. Also, the relation between the conditions of the functional gel and the display color is the same as shown in Table 1.

[Embodiment 21]

As shown in FIG. 54, functional gel particulates of acrylic amide are dispersed and adsorbed on the surface of pigment particulates about 10 μm in average grain size. The resulting assembly is dispersed in an electrolyte. Three types of pigment particulates of red, green and blue are used.

Using this electrolyte, as in the 19th embodiment, a display device according to this embodiment is produced. A voltage is applied between the electrodes of the display device so that the functional gel is deformed (expanded or contracted), thereby making it possible to display a superior color image. In this case, the reflectance for white display is not less than 70%, with a contrast of about 2.5 with respect to black display. The relation between the conditions of functional gel of each color and the displayed color is the same as shown in Table 1. The low contrast in this embodiment as compared with the 19th and 20th embodiments stems from the fact that the cracking position of the functional gel thin film 63 is not specified, and therefore less visual light is absorbed by the pigment particulates at the time of gel contraction.

[Embodiment 22]

As shown in FIG. 52, functional gel particulates of black-colored acrylic amide are dispersed and adsorbed on the surface of pigment particulates about 10 μm in average grain size, and the resulting assembly is dispersed in an electrolyte. Three types of pigment particulates of red, green and blue are used.

Then, an electrode is formed on a lower substrate by the same method as employed in the foregoing embodiments, and a reflection layer of aluminum or the like is formed thereon. Further, three areas of red, green and blue are formed on this assembly. Further, an electrode is formed on the upper electrode by the same method as in the above-mentioned embodiments. The upper and lower substrates are attached to each other thereby to produce a cell as in the above-mentioned embodiments. An electrolyte containing red, green and blue pigment particulates having a functional gel is injected into each of these areas thereby to fabricate a reflection-type display device according to this embodiment.

A voltage is applied between the electrodes of this display device to deform (expand or contract) the functional gel, thereby displaying a superior color image. In this case, the reflectance for white display is about 30% with a contrast of about 3 with respect to black.

The range of color display in this embodiment has been found to be wider than that of the 19th embodiment. In the case where a clearer color display is intended in a comparatively bright ambience, therefore, the configuration of this embodiment is desirably used. For trying a clearer display in a comparatively dark ambience, on the other hand, the configurations of the 19th or 21th embodiment are preferred. The relation between the conditions of the functional gel for each color and the display color according to this embodiment is shown in Table 2 below.

TABLE 2

| Red Area | Green Area | Blue Area | Displayed Color |
|---|---|---|---|
| Contraction | Contraction | Contraction | White |
| Contraction | Expansion | Expansion | Red |
| Expansion | Contraction | Expansion | Green |
| Expansion | Expansion | Contraction | Blue |
| Contraction | Contraction | Expansion | Yellow |
| Contraction | Expansion | Contraction | Magenta |
| Expansion | Contraction | Contraction | Cyan |
| Expansion | Expansion | Expansion | Black |

[Embodiment 23]

Light-scattering functional gel particulates colored yellow are adsorbed on the surface of blue pigment particulates, light-scattering functional gel particulates colored magenta are adsorbed on the surface of green pigment particulates, and light-scattering functional gel particulates colored cyan are adsorbed on the surface of red pigment particulates.

An electrode is then formed on a lower electrode by the method described above. This assembly is further formed with three areas of pixel 1, pixel 2 and pixel 3 in juxtaposition. Further, an upper substrate is formed with an electrode by the same method as in the foregoing embodiments. The upper and lower substrates are attached to each other to produce a cell. An electrolyte containing the blue, green and red pigment particulates having the colored functional gel is injected into the respective areas of the cell.

A voltage is applied between the electrodes of the display device so that the functional gel is deformed (expanded or contracted) thereby to display a superior color image. More specifically, in pixel 1, the color is yellow when the gel expands while the hue continuously changes toward blue with the contraction of the gel. Similarly, in pixel 2, the hue changes continuously from magenta to green, while in pixel 3 the hue changes is continuous from cyan to red. In this display device, all the functional gels are expanded for white display. The reflectance for white display is about 60%, which is about a double that for the 22nd embodiment.

The invention is not limited to the above-mentioned embodiments but can be variously modified with equal effect. The other materials of the functional gel than describe above, for example, may include polysaccharide, natural polymer gel of protein, various vinyl monomers, divinyl compounds, acrylic acid, metha-acrylic acid, acrylic amide, ethylene glycol di-metha-acrylate, acrylic compounds of methylene bisacrylic amide, polymers of hydroxyl group, aldehyde, N-methylol compounds, carbonic acid, di-carbonic acid, polyvinyl alcohol, polyeter, 2-oxazolinic acid, 2-methyl propane sulfonic acid, perfluoro sulfonic acid, or polymers, copolymers or oligomers containing any of the above-mentioned compounds.

Also, cross-linking agents that can be used include the above-mentioned compounds, alkali metals, alkali earth metal compounds and metal ions. The cross-linking methods employable include thermal polymerization, optical polymerization, radioactive polymerization and cross-linking polymerization.

Various surface active agents and various salts can be used as the response regulator for the functional gels. The surface active agents that can be used include organic sulfonic acid compounds and salts of alkyl benzene sulfonic acid soda, carboxylates such as salts of higher fatty acid and salts thereof, organic amine, imine, amide, ammonium compounds and salts thereof. The salts include aqueous salts of alkali metals and alkali earth metals, aqueous chlorides, sulfates, carboxylates and other metal salts. For a display device low in power consumption and high in response speed is to be realized, selected combinations of the above-mentioned materials are used preferably.

It will thus be understood from the foregoing description that according to the present invention, there is provided a novel display device, in which a light modulation layer is switched taking advantage of the deformation of a functional gel, that is, an electrical signal is applied to a functional gel to bend/extend, contract/expand or coagulate/disperse it, and the functional gel thus is used as a light shutter. A thin, light-weight display device thus is provided which consumes less power and is suitable for use with a portable terminal.

What is claimed is:

1. A display device comprising a pair of substrates and a light modulation layer arranged between said substrates, wherein said light modulation layer includes a functional gel adapted to be deformed by an electric field applied between electrodes interposed between said substrates, and the light incident on said light modulation layer is regulated by the deformation of said functional gel.

2. A display device according to claim 1, wherein said deformation of said functional gel is caused by selected one of the phenomenal sets including bending/extension, contraction/expansion and coagulation/dispersion.

3. A display device according to claim 1, wherein said light modulation layer includes selected one of a suspension and an emulsion, and said functional gel is film-shaped and arranged in said selected one of the suspension and the emulsion, said light modulation layer being switched between the mode in which said functional gel is in contact with the substrate surface and the mode in which said functional gel is out of contact with the substrate surface in accordance with the presence or absence of an electric field applied between said electrodes.

4. A display device according to claim 1, wherein said functional gel is film-shaped and adapted to bend or extend according to the presence or absence of an electric field applied between said electrodes, thereby switching said light modulation layer between the mode in which the substrate surface is hidden by the bend of said functional gel and the mode in which the substrate surface is exposed by the extension of said functional gel.

5. A display device according to claim 1, wherein said functional gel is particulate and adapted to expand or contract according to the presence or absence of an electric field applied between said electrodes, thereby switching said light modulation layer between the mode in which the substrate surface is hidden by said functional gel and the mode in which said substrate surface is exposed.

6. A display device according to claim 5, wherein said functional gel is present in the form of selected one of a liquid and another gel in said light modulation layer.

7. A display device according to claim 5, wherein the particulates of said functional gel have a grain size of at least 0.3 μm.

8. A display device according to claim 1, wherein said functional gel fibrous and is woven to constitute cloth, said functional gel being adapted to expand and contract according to the presence or absence of an electric field applied between said electrodes, thereby switching said light modulation layer between the mode in which the substrate surface is hidden and the mode in which said substrate surface is exposed.

9. A display device comprising a pair of substrates and a light modulation layer interposed between said substrates, wherein said light modulation layer includes particles adapted to coagulate or disperse in response to an electric field applied between a pair of electrodes interposed between said substrates, and the light incident on said light modulation layer is regulated according to the coagulation and dispersion of said particles.

10. A display device according to claim 9, wherein said particles coagulate or disperse according to the presence or absence of an electric field applied between said electrodes, thereby switching said light modulation layer between the mode in which the substrate surface is hidden and the mode in which said substrate surface is exposed.

11. A display device according to claim 9, wherein said particles have a grain size of at least 0.3 μm.

12. A display device comprising a pair of substrates and a light modulation layer interposed between said substrates, wherein said light modulation layer includes at least a member for defining at least a pixel area and at least a functional gel mounted on said member and adapted to be deformed by an electric field applied between a pair of electrodes interposed between said substrates, and the light incident on said light modulation layer is regulated by the deformation of said functional gel.

13. A display device according to claim 12, wherein said functional gel is expanded or contracted according to the presence or absence of an electric field applied between said electrodes, thereby switching said light modulation layer between the mode in which the substrate surface is hidden and the mode in which said substrate surface is exposed.

14. A display device according to claim 12, wherein said member constitutes a cylinder, and said functional gel is arranged in said cylinder and is adapted to expand or contract according to the presence or absence of an electric field applied between said electrodes, thereby switching said light regulation layer between the mode in which said cylinder is filled with said functional gel and the mode in which said cylinder is not filled with said functional gel.

15. A display device according to claim 12, wherein said functional gel is elongate and supported by said member in such a manner as to divide a pixel area defined by said member, a film is formed in a space defined by said member and said elongate functional gel, said functional gel being adapted to extend or bend according to the presence or absence of an electric field applied between said electrodes, thereby switching said light modulation layer between the mode in which said film is suppressed with said functional gel being bent and the mode in which said film is spread out with said functional gel being extended.

16. A display device according to claim 12, wherein a microfilm is connected to said member through said functional gel, and said functional gel is adapted to extend or bend, thereby switching said light modulation layer between the mode in which said pixel area is covered by said microfilm and the mode in which said pixel area is not covered by said microfilm.

17. A display device according to claim 12, wherein said member is connected to a microfilm through a hinge, said functional gel is mounted on said microfilm in such a way that the direction of the surface of said microfilm is changed by the expansion and contraction of said functional gel, and the expansion and contraction of said functional gel switches said light modulation layer between the mode in which the microfilm surface is substantially parallel with the substrate surface and the mode in which the microfilm surface is at an angle to the substrate surface.

* * * * *